US010580424B2

(12) United States Patent
Mirzahasanloo

(10) Patent No.: US 10,580,424 B2
(45) Date of Patent: Mar. 3, 2020

(54) PERCEPTUAL AUDIO CODING AS SEQUENTIAL DECISION-MAKING PROBLEMS

(71) Applicant: QUALCOMM Incorporated, San Diego, CA (US)

(72) Inventor: Taher Shahbazi Mirzahasanloo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/050,966

(22) Filed: Jul. 31, 2018

(65) Prior Publication Data

US 2019/0371348 A1 Dec. 5, 2019

Related U.S. Application Data

(60) Provisional application No. 62/679,250, filed on Jun. 1, 2018.

(51) Int. Cl.
*G10L 19/00* (2013.01)
*G10L 19/038* (2013.01)
(Continued)

(52) U.S. Cl.
CPC ............ *G10L 19/038* (2013.01); *G06N 20/00* (2019.01); *G10L 19/22* (2013.01); *H04R 3/005* (2013.01); *H04W 84/12* (2013.01)

(58) Field of Classification Search
CPC ..... G10L 19/00; G10L 19/002; G10L 19/005; G10L 19/008; G10L 19/16; G10L 19/22;
(Continued)

(56) References Cited

U.S. PATENT DOCUMENTS 5,150,387 A * 9/1992 Yoshikawa ............. G10L 19/24
375/240
5,241,535 A * 8/1993 Yoshikawa ............. H04B 1/667
370/394

(Continued)

FOREIGN PATENT DOCUMENTS

CN 101145787 A 3/2008
WO 2015162500 A2 10/2015

OTHER PUBLICATIONS

"Bluetooth Core Specification v 5.0," published Dec. 6, 2016 accessed from https://www.bluetooth.com/specifications, 5 pp.

(Continued)

*Primary Examiner* — Gerald Gauthier
(74) *Attorney, Agent, or Firm* — Shumaker & Sieffert, P.A.

(57) ABSTRACT

In general, techniques are described by which to perform perceptual audio coding as sequential decision making problems. A source device comprising a memory and a processor may be configured to perform the techniques. The memory may store at least a portion of the audio data. The processor may apply a filter to the audio data to obtain subbands of the audio data. The processor may adapt a controller according to a machine learning algorithm, the controller configured to determine bit distributions across the subbands of the audio data. The processor may specify, based on the bit distributions and in a bitstream representative of the audio data, one or more indications representative of the subbands of the audio data, and output the bitstream via a wireless connection in accordance with a wireless communication protocol.

30 Claims, 15 Drawing Sheets

(51) Int. Cl.
  *G10L 19/22* (2013.01)
  *H04R 3/00* (2006.01)
  *H04W 84/12* (2009.01)
  *G06N 20/00* (2019.01)

(58) Field of Classification Search
  CPC ... G10L 19/038; G10L 21/0216; G10L 19/09;
       H04B 1/66; H04L 29/08; H04R 3/005;
       H04R 3/04; H04W 84/12; G06K 9/00;
              G06N 5/04; G06N 99/00
  USPC ......... 370/394; 375/240; 382/275; 455/41.2;
         704/205, 219, 222, 236, 500, 501, 229,
                     704/503; 700/94; 706/21, 46
  See application file for complete search history.

(56) References Cited

U.S. PATENT DOCUMENTS

| | | | |
|---|---|---|---|
| 5,594,833 | A | 1/1997 | Miyazawa et al. |
| 6,567,781 | B1 | 5/2003 | Lafe |
| 6,574,593 | B1 | 6/2003 | Gao et al. |
| 6,725,192 | B1 | 4/2004 | Araki |
| 6,735,339 | B1 | 5/2004 | Ubale |
| 7,139,702 | B2* | 11/2006 | Tsushima ............ G10L 19/0208 704/222 |
| 7,499,898 | B1* | 3/2009 | Owen .................... G06N 20/00 706/46 |
| 7,689,427 | B2 | 3/2010 | Vasilache |
| 7,702,514 | B2 | 4/2010 | Lin et al. |
| 7,904,293 | B2* | 3/2011 | Wang .................... G10L 19/005 704/222 |
| 8,694,325 | B2 | 4/2014 | Lin et al. |
| 9,015,052 | B2 | 4/2015 | Lin et al. |
| 9,159,331 | B2* | 10/2015 | Kim ...................... G10L 19/028 |
| 9,263,050 | B2* | 2/2016 | Daniel ................. G10L 19/002 |
| 9,546,924 | B2 | 1/2017 | Grancharov et al. |
| 9,754,594 | B2 | 9/2017 | Liu et al. |
| 9,972,334 | B2* | 5/2018 | Subasingha ............ G10L 19/06 |
| 10,032,281 | B1* | 7/2018 | Ghesu ....................... G06T 7/12 |
| 2002/0111704 | A1* | 8/2002 | Suzuki ............... G10L 19/0208 700/94 |
| 2004/0002859 | A1 | 1/2004 | Liu et al. |
| 2006/0270347 | A1* | 11/2006 | Ibrahim ................. H04H 20/08 455/41.2 |
| 2007/0033057 | A1* | 2/2007 | Covell .................... G10L 21/04 704/503 |
| 2007/0093206 | A1* | 4/2007 | Desai .................... H04B 14/04 455/41.2 |
| 2007/0198256 | A1* | 8/2007 | Hu ........................ G10L 19/008 704/229 |
| 2007/0286524 | A1* | 12/2007 | Song ...................... G06F 21/32 382/275 |
| 2010/0174531 | A1 | 7/2010 | Bernard Vos |
| 2012/0296658 | A1 | 11/2012 | Smyth |
| 2013/0060365 | A1* | 3/2013 | Jeong ..................... G10L 19/20 700/94 |
| 2013/0275140 | A1 | 10/2013 | Kim et al. |
| 2014/0039890 | A1* | 2/2014 | Mundt .................. G10L 19/167 704/236 |
| 2014/0046670 | A1* | 2/2014 | Moon ..................... G10L 19/02 704/500 |
| 2014/0052439 | A1* | 2/2014 | Rose ....................... G10L 19/09 704/219 |
| 2014/0052678 | A1* | 2/2014 | Martinez .................. G06N 3/08 706/21 |
| 2014/0156284 | A1* | 6/2014 | Porov ................. G10L 19/0017 704/500 |
| 2015/0317991 | A1* | 11/2015 | Liu ..................... G10L 19/0204 704/205 |
| 2016/0189722 | A1* | 6/2016 | Nagisetty .............. G10L 19/038 704/501 |
| 2016/0232910 | A1* | 8/2016 | Fischer .................. G10L 19/167 |
| 2016/0275955 | A1 | 9/2016 | Liu et al. |
| 2016/0307578 | A1* | 10/2016 | Rose ........................ G10L 19/09 |
| 2017/0084280 | A1* | 3/2017 | Srinivasan ............. G10L 19/005 |
| 2017/0147949 | A1* | 5/2017 | Uchibe ................. G06K 9/6297 |
| 2017/0213151 | A1* | 7/2017 | Uchibe .................. G06N 20/00 |
| 2017/0223356 | A1 | 8/2017 | Sung et al. |
| 2017/0228655 | A1* | 8/2017 | Alarie ..................... G06Q 10/00 |
| 2017/0365260 | A1* | 12/2017 | Chebiyyam ........... G10L 19/008 |
| 2018/0182400 | A1* | 6/2018 | Choo ...................... G10L 19/02 |
| 2018/0288182 | A1* | 10/2018 | Tong ......................... B60R 1/00 |
| 2018/0374495 | A1* | 12/2018 | Fienberg ............. G10L 21/0216 |
| 2019/0156844 | A1* | 5/2019 | Fischer ................. G10L 19/167 |
| 2019/0230438 | A1* | 7/2019 | Hatab ..................... G10L 25/18 |

OTHER PUBLICATIONS

"Advanced Audio Distribution Profile Specification," version 1.3.1, published Jul. 14, 2015, 35 pp.

Hung, et al., "Error-resilient pyramid vector quantization for image compression," IEEE Transactions on Image Processing, vol. 7, No. 10, Oct. 1998, pp. 1373-1386.

Chou, et al., "Vertex Data Compression through Vector Quantization," IEEE Transactions on Visualization and Computer Graphics, vol. 8, No. 4, Oct.-Dec. 2002, pp. 373-382.

Svedberg et al., "MDCT Audio Coding with Pulse Vector Quantizers," 2015 IEEE International Conference on Acoustics, Speech, and Signal Processing, Apr. 2015, accessed from https://www.ericsson.com/assets/local/publications/conference-papers/mdct_audio_coding_with_pulse_vector_quantizers.pdf, 5 pp.

Sutton et al., "Chapter 13: Policy Gradient Methods," Reinforcement Learning: An Introduction, second edition, Nov. 2018, pp. 323-340.

Fischer, "A pyramid vector quantizer," IEEE Transactions on Information Theory, vol. 32 No. 4, Jul. 1986, pp. 568-583.

Hong, "Unsupervised Feature Selection Using Clustering Ensembles and Population Based Incremental Learning Algorithm," Dec. 20, 2007, 32 pp.

Bishop, "Pattern Recognition and Machine Learning" Information Science and Statistics, published Apr. 2011, 758 pp.

U.S. Appl. No. 16/050,894, filed by Taher Shahbazi Mirzahasanloo et al., [Qualcomm, Inc.], filed Jul. 31, 2018.

U.S. Appl. No. 16/050,844, filed by Taher Shahbazi Mirzahasanloo et al., [Qualcomm, Inc.], filed Jul. 31, 2018.

U.S. Appl. No. 16/051,007, filed by Taher Shahbazi Mirzahasanloo et al., [Qualcomm, Inc.], filed Jul. 31, 2018.

* cited by examiner

PERCEPTUAL AUDIO CODING AS SEQUENTIAL DECISION-MAKING PROBLEMS

This disclosure claims the benefit of U.S. Provisional Application No. 62/679,250, filed Jun. 1, 2018, the entire contents of which is hereby incorporated by reference in its entirety.

TECHNICAL FIELD

This disclosure relates to audio encoding and decoding.

BACKGROUND

Wireless networks for short-range communication, which may be referred to as "personal area networks," are established to facilitate communication between a source device and a sink device. One example of a personal area network (PAN) protocol is Bluetooth®, which is often used to form a PAN for streaming audio data from the source device (e.g., a mobile phone) to the sink device (e.g., headphones or a speaker).

In some examples, the Bluetooth® protocol is used for streaming encoded or otherwise compressed audio data. In some examples, audio data is encoded using gain-shape vector quantization audio encoding techniques. In gain-shape vector quantization audio encoding, audio data is transformed into the frequency domain and then separated into subbands of transform coefficients. A scalar energy level (e.g., gain) of each subband is encoded separately from the shape (e.g., a residual vector of transform coefficients) of the subband.

SUMMARY

In general, this disclosure relates to techniques for performing perceptual audio coding framed as a sequential decision-making problem. Sequential decision making refers to a way by which to frame the perceptual audio coding in the context of dynamic bit allocation. Rather than attempt to recreate a full psychoacoustic model to ensure perceptual quality, the dynamic bit allocation is reduced to a sequential decision-making problem, where actions regarding bit distributions across subbands are evaluated and updated sequentially to achieve a target bitrate for current environmental conditions.

In one aspect, the techniques are directed to a source device configured to stream audio data, the source device comprising: a memory configured to store at least a portion of the audio data; and one or more processors configured to: apply a filter to the audio data to obtain subbands of the audio data; adapt a controller according to a machine learning algorithm, the controller configured to determine bit distributions across the subbands of the audio data; specify, based on the bit distributions and in a bitstream representative of the audio data, one or more indications representative of the subbands of the audio data; and output the bitstream via a wireless connection in accordance with a wireless communication protocol.

In another aspect, the techniques are directed to a method for streaming audio data, the method comprising: applying a filter to the audio data to obtain subbands of the audio data; adapting a controller according to a machine learning algorithm, the controller configured to determine bit distributions across the subbands of the audio data; specifying, based on the bit distributions and in a bitstream representative of the audio data, one or more indications representative of the subbands of the audio data; and outputting the bitstream via a wireless connection in accordance with a wireless communication protocol.

In another aspect, the techniques are directed to an apparatus configured to stream audio data, the apparatus comprising: means for applying a filter to the audio data to obtain subbands of the audio data; means for adapting a controller according to a machine learning algorithm, the controller configured to determine bit distributions across the subbands of the audio data; means for specifying, based on the bit distributions and in a bitstream representative of the audio data, one or more indications representative of the subbands of the audio data; and means for outputting the bitstream via a wireless connection in accordance with a wireless communication protocol.

In another aspect, the techniques are directed to a computer-readable medium storing instructions that, when executed, cause one or more processors to: apply a filter to audio data to obtain subbands of the audio data; adapt a controller according to a machine learning algorithm, the controller configured to determine bit distributions across the subbands of the audio data; specify, based on the bit distributions and in a bitstream representative of the audio data, one or more indications representative of the subbands of the audio data; and output the bitstream via a wireless connection in accordance with a wireless communication protocol.

In another aspect, the techniques are directed to a sink device configured to process a bitstream representative of audio data, the sink device comprising: a memory configured to store at least a portion of the bitstream; and one or more processors configured to: adapt a controller according to a machine learning algorithm, the controller configured to determine bit distributions across subbands of transformed audio data; obtain, based on the bit distributions and from the bitstream, the subbands of the transformed audio data; obtain, based on the subbands of the transformed audio data, the transformed audio data; and apply an inverse transform to the transformed audio data to obtain the audio data.

In another aspect, the techniques are directed to a method of processing a bitstream representative of audio data, the method comprising: adapting a controller according to a machine learning algorithm, the controller configured to determine bit distributions across subbands of transformed audio data; obtaining, based on the bit distributions and from the bitstream, the subbands of the transformed audio data; obtaining, based on the subbands of the transformed audio data, the transformed audio data; and applying an inverse transform to the transformed audio data to obtain the audio data.

In another aspect, the techniques are directed to an apparatus for processing a bitstream representative of audio data, the apparatus comprising: means for adapting a controller according to a machine learning algorithm, the controller configured to determine bit distributions across subbands of transformed audio data; means for obtaining, based on the bit distributions and from the bitstream, the subbands of the transformed audio data; means for obtaining, based on the subbands of the transformed audio data, the transformed audio data; and means for applying an inverse transform to the transformed audio data to obtain the audio data.

In another aspect, the techniques are directed to a computer-readable medium storing instructions that, when executed, cause one or more processors to: adapt a controller according to a machine learning algorithm, the controller configured to determine bit distributions across subbands of transformed audio data; obtain, based on the bit distributions and from the bitstream, the subbands of the transformed audio data; obtain, based on the subbands of the transformed audio data, the transformed audio data; and apply an inverse transform to the transformed audio data to obtain the audio data.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
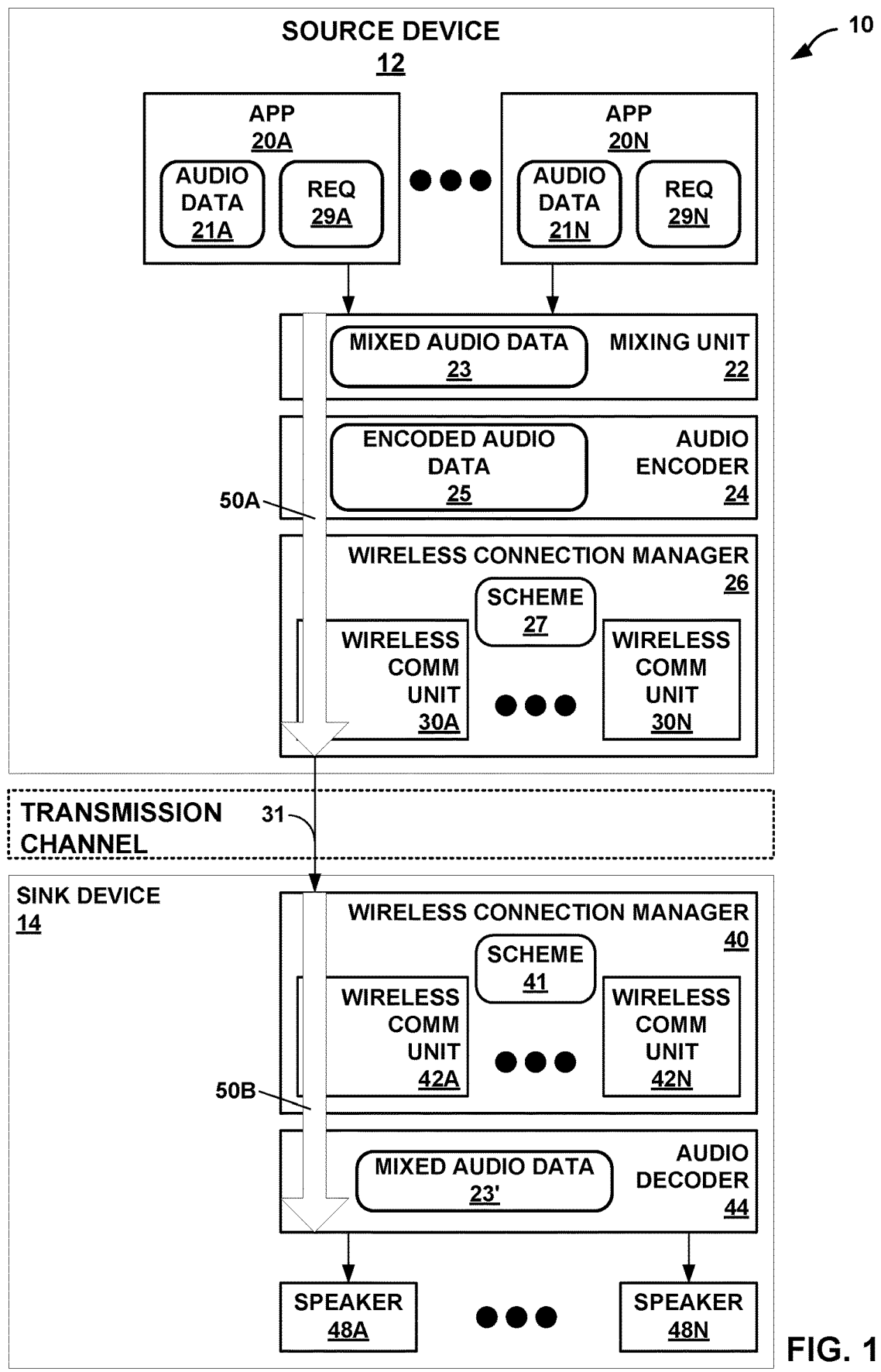
FIG. 1 is a block diagram illustrating a system that may perform various aspects of the techniques described in this disclosure.

FIG. 1 is a diagram illustrating a system 10 that may perform various aspects of the techniques described in this disclosure for perceptual audio coding. As shown in the example of FIG. 1, the system 10 includes a source device 12 and a sink device 14. Although described with respect to the source device 12 and the sink device 14, the source device 12 may operate, in some instances, as the sink device, and the sink device 14 may, in these and other instances, operate as the source device. As such, the example of system 10 shown in FIG. 1 is merely one example illustrative of various aspects of the techniques described in this disclosure.

In any event, the source device 12 may represent any form of computing device capable of implementing the techniques described in this disclosure, including a handset (or cellular phone), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as s digital video disc player, a streaming media player, a Blue-Ray Disc™ player, etc.), or any other device capable of communicating audio data wirelessly to a sink device via a personal area network (PAN). For purposes of illustration, the source device 12 is assumed to represent a smart phone.

The sink device 14 may represent any form of computing device capable of implementing the techniques described in this disclosure, including a handset (or cellular phone), a tablet computer, a smart phone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 14 is assumed to represent wireless headphones.

As shown in the example of FIG. 1, the source device 12 includes one or more applications ("apps") 20A-20N ("apps 20"), a mixing unit 22, an audio encoder 24, and a wireless connection manager 26. Although not shown in the example of FIG. 1, the source device 12 may include a number of other elements that support operation of apps 20, including an operating system, various hardware and/or software interfaces (such as user interfaces, including graphical user interfaces), one or more processors, memory, storage devices, and the like.

Each of the apps 20 represent software (such as a collection of instructions stored to a non-transitory computer readable media) that configure the system 10 to provide some functionality when executed by the one or more processors of the source device 12. The apps 20 may, to list a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 20 may be first party applications designed and developed by the same company that designs and sells the operating system executed by the source device 12 (and often pre-installed on the source device 12) or third-party applications accessible via a so-called "app store" or possibly pre-installed on the source device 12. Each of the apps 20, when executed, may output audio data 21A-21N ("audio data 21"), respectively. In some examples, the audio data 21 may be generated from a microphone (not pictured) connected to the source device 12.

The mixing unit 22 represents a unit configured to mix one or more of audio data 21A-21N ("audio data 21") output by the apps 20 (and other audio data output by the operating system—such as alerts or other tones, including keyboard press tones, ringtones, etc.) to generate mixed audio data 23. Audio mixing may refer to a process whereby multiple sounds (as set forth in the audio data 21) are combined into one or more channels. During mixing, the mixing unit 22 may also manipulate and/or enhance volume levels (which may also be referred to as "gain levels"), frequency content, and/or panoramic position of the audio data 21. In the context of streaming the audio data 21 over a wireless PAN session, the mixing unit 22 may output the mixed audio data 23 to the audio encoder 24.

The audio encoder 24 may represent a unit configured to encode the mixed audio data 23 and thereby obtain encoded audio data 25. In some examples, the audio encoder 24 may encode individual ones of the mixed audio data 23. Referring for purposes of illustration to one example of the PAN protocols, Bluetooth® provides for a number of different types of audio codecs (which is a word resulting from combining the words "encoding" and "decoding") and is extensible to include vendor specific audio codecs. The Advanced Audio Distribution Profile (A2DP) of Bluetooth® indicates that support for A2DP requires supporting a subband codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX (e.g., enhanced aptX—E-aptX, aptX live, and aptX high definition—aptX-HD).

The audio encoder 24 may operate consistent with one or more of any of the above listed audio codecs, as well as, audio codecs not listed above, but that operate to encode the mixed audio data 23 to obtain the encoded audio data 25. The audio encoder 24 may output the encoded audio data 25 to one of the wireless communication units 30 (e.g., the wireless communication unit 30A) managed by the wireless connection manager 26. The audio encoder 24 may be configured to encode the mixed audio data 21 and/or the mixed audio data 23 using a pyramid vector quantization.

The wireless connection manager 26 may represent a unit configured to allocate bandwidth within certain frequencies of the available spectrum to the different ones of the wireless communication units 30. For example, the Bluetooth® communication protocols operate over within the 2.5 GHz range of the spectrum, which overlaps with the range of the spectrum used by various WLAN communication protocols. The wireless connection manager 26 may allocate some portion of the bandwidth during a given time to the Bluetooth® protocol and different portions of the bandwidth during a different time to the overlapping WLAN protocols. The allocation of bandwidth and other is defined by a scheme 27. The wireless connection manager 40 may expose various application programmer interfaces (APIs) by which to adjust the allocation of bandwidth and other aspects of the communication protocols so as to achieve a specified quality of service (QoS). That is, the wireless connection manager 40 may provide the API to adjust the scheme 27 by which to control operation of the wireless communication units 30 to achieve the specified QoS.

In other words, the wireless connection manager 26 may manage coexistence of multiple wireless communication units 30 that operate within the same spectrum, such as certain WLAN communication protocols and some PAN protocols as discussed above. The wireless connection manager 26 may include a coexistence scheme 27 (shown in FIG. 1 as "scheme 27") that indicates when (e.g., an interval) and how many packets each of the wireless communication units 30 may send, the size of the packets sent, and the like.

The wireless communication units 30 may each represent a wireless communication unit 30 that operates in accordance with one or more communication protocols to communicate encoded audio data 25 via a transmission channel to the sink device 14. In the example of FIG. 1, the wireless communication unit 30A is assumed for purposes of illustration to operate in accordance with the Bluetooth® suite of communication protocols. It is further assumed that the wireless communication unit 30A operates in accordance with A2DP to establish a PAN link (over the transmission channel) to allow for delivery of the encoded audio data 25 from the source device 12 to the sink device 14.

More information concerning the Bluetooth® suite of communication protocols can be found in a document entitled "Bluetooth Core Specification v 5.0," published Dec. 6, 2016, and available at: www.bluetooth.org/en-us/specification/adopted-specifications. More information concerning A2DP can be found in a document entitled "Advanced Audio Distribution Profile Specification," version 1.3.1, published on Jul. 14, 2015.

The wireless communication unit 30A may output the encoded audio data 25 as a bitstream 31 to the sink device 14 via a transmission channel, which may be a wired or wireless channel, a data storage device, or the like. While shown in FIG. 1 as being directly transmitted to the sink device 14, the source device 12 may output the bitstream 31 to an intermediate device positioned between the source device 12 and the sink device 14. The intermediate device may store the bitstream 31 for later delivery to the sink device 14, which may request the bitstream 31. The intermediate device may comprise a file server, a web server, a desktop computer, a laptop computer, a tablet computer, a mobile phone, a smart phone, or any other device capable of storing the bitstream 31 for later retrieval by an audio decoder. This intermediate device may reside in a content delivery network capable of streaming the bitstream 31 (and possibly in conjunction with transmitting a corresponding video data bitstream) to subscribers, such as the sink device 14, requesting the bitstream 31.

Alternatively, the source device 12 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the sink device 14 includes a wireless connection manager 40 that manages one or more of wireless communication units 42A-42N ("wireless communication units 42") according to a scheme 41, an audio decoder 44, and one or more speakers 48A-48N ("speakers 48"). The wireless connection manager 40 may operate in a manner similar to that described above with respect to the wireless connection manager 26, exposing an API to adjust scheme 41 by which operation of the wireless communication units 42 can be adjusted to achieve a specified QoS.

The wireless communication units 42 of sink device 14 may be similar in operation to the wireless communication units 30 of source device 12, except that the wireless communication units 42 operate reciprocally to the wireless communication units 30 to decapsulate the encoded audio data 25. One of the wireless communication units 42 (e.g., the wireless communication unit 42A) is assumed to operate in accordance with the Bluetooth® suite of communication protocols and reciprocal to the wireless communication protocol 28A. The wireless communication unit 42A may output the encoded audio data 25 to the audio decoder 44.

The audio decoder 44 may operate in a manner that is reciprocal to the audio encoder 24. The audio decoder 44 may operate consistent with one or more of any of the above listed audio codecs, as well as audio codecs not listed above, but that operate to decode the encoded audio data 25 to obtain mixed audio data 23'. The prime designation with respect to "mixed audio data 23" denotes that there may be some loss due to quantization or other lossy operations that occur during encoding by the audio encoder 24. The audio decoder 44 may output the mixed audio data 23' to one or more of the speakers 48.

Each of the speakers 48 represents a transducer configured to reproduce a soundfield from the mixed audio data 23'. The transducer may be integrated within the sink device 14 as shown in the example of FIG. 1 or may be communicatively coupled to the sink device 14 (via a wire or wirelessly). The speakers 48 may represent any form of speaker, such as a loudspeaker, a headphone speaker, or a speaker in an earbud. Furthermore, although described with respect to a transducer, the speakers 48 may represent other forms of speakers, such as the "speakers" used in bone conducting headphones that send vibrations to the upper jaw, which induces sound in the human aural system.

As noted above, the apps 20 may output audio data 21 to the mixing unit 22. Prior to outputting the audio data 21, the apps 20 may interface with the operating system to initialize an audio processing path for output via integrated speakers (not shown in the example of FIG. 1) or a physical connection (such as a mini-stereo audio jack, which is also known as 3.5 millimeter—mm—minijack). As such, the audio processing path may be referred to as a wired audio processing path considering that the integrated speaker is connected by a wired connection similar to that provided by the physical connection via the mini-stereo audio jack. The wired audio processing path may represent hardware or a combination of hardware and software that processes the audio data 21 to achieve a target quality of service (QoS).

To illustrate, one of the apps 20 (which is assumed to be the app 20A for purposes of illustration) may issue, when initializing or reinitializing the wired audio processing path, one or more requests 29A for a particular QoS for the audio data 21A output by the app 20A. The request 29A may specify, as a couple of examples, a high latency (that results in high quality) wired audio processing path, a low latency (that may result in lower quality) wired audio processing path, or some intermediate latency wired audio processing path. The high latency wired audio processing path may also be referred to as a high quality wired audio processing path, while the low latency wired audio processing path may also be referred to as a low quality wired audio processing path.

Figure 2:
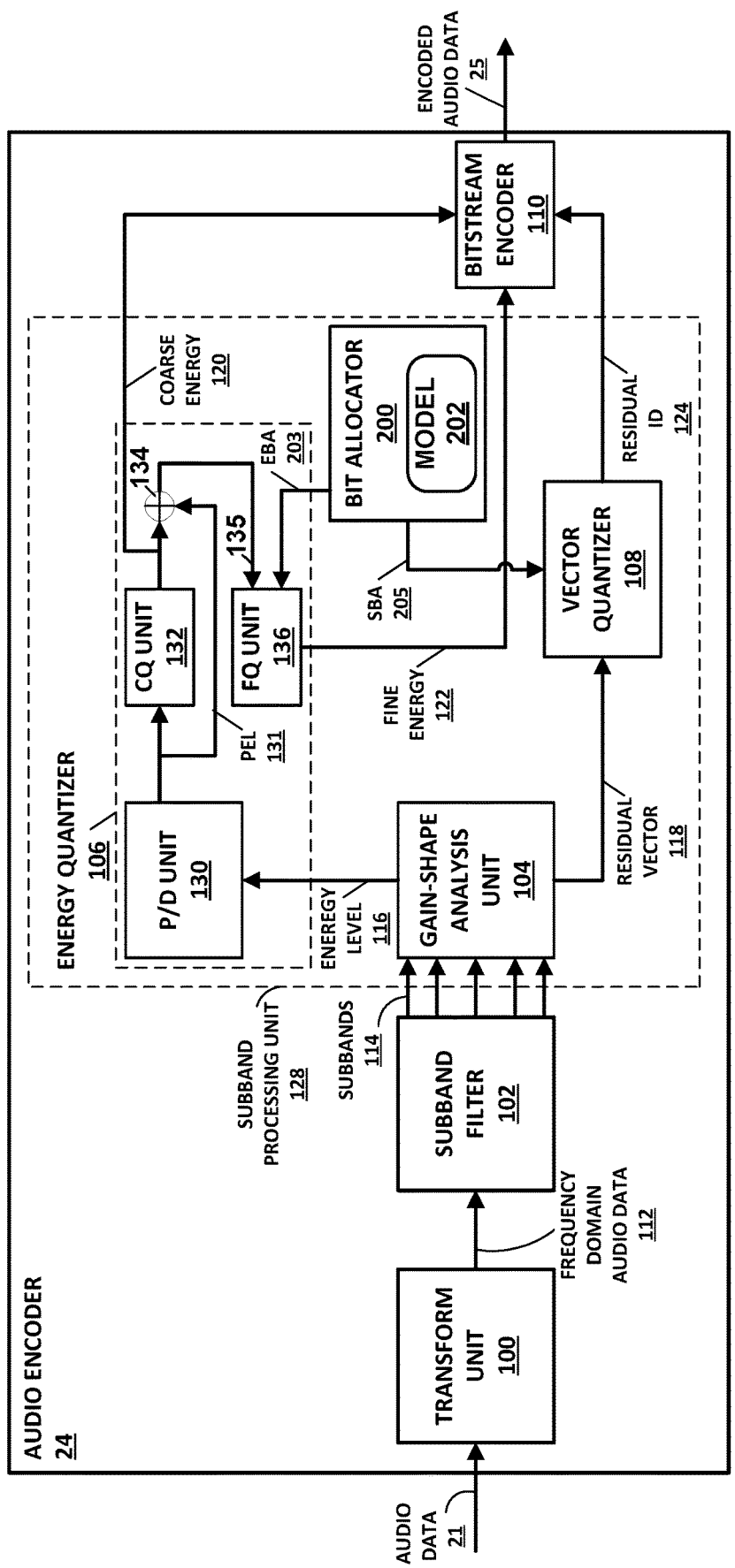
FIG. 2 is a block diagram illustrating an example audio encoder configured to perform various aspects of the techniques described in this disclosure.

FIG. 2 is a block diagram illustrating an example of an audio encoder 24 configured to perform various aspects of the techniques described in this disclosure. The audio encoder 24 may be configured to encode audio data for transmission over a PAN (e.g., Bluetooth®). However, the techniques of this disclosure performed by the audio encoder 24 may be used in any context where the compression of audio data is desired. In some examples, the audio encoder 24 may be configured to encode the audio data 21 in accordance with as aptX™ audio codec, including, e.g., enhanced aptX—E-aptX, aptX live, and aptX high definition. However, the techniques of this disclosure may be used in any audio codec. As will be explained in more detail below, the audio encoder 24 may be configured to perform various aspects of perceptual audio coding in accordance with various aspects of the techniques described in this disclosure.

In the example of FIG. 2, the audio encoder 24 may be configured to encode the audio data 21 (or the mixed audio data 23) using a gain-shape vector quantization encoding process. In a gain-shape vector quantization encoding process, the audio encoder 24 is configured to encode both a gain (e.g., an energy level) and a shape (e.g., a residual vector defined by transform coefficients) of a subband of frequency domain audio data. Each subband of frequency domain audio data represents a certain frequency range of a particular frame of the audio data 21.

The audio data 21 may be sampled at a particular sampling frequency. Example sampling frequencies may include 48 kHz or 44.1 kHZ, though any desired sampling frequency may be used. Each digital sample of the audio data 21 may be defined by a particular input bit depth, e.g., 16 bits or 24 bits. In one example, the audio encoder 24 may be configured operate on a single channel of the audio data 21 (e.g., mono audio). In another example, the audio encoder 24 may be configured to independently encode two or more channels of the audio data 21. For example, the audio data 21 may include left and right channels for stereo audio. In this example, the audio encoder 24 may be configured to encode the left and right audio channels independently in a dual mono mode. In other examples, the audio encoder 24 may be configured to encode two or more channels of the audio data 21 together (e.g., in a joint stereo mode). For example, the audio encoder 24 may perform certain compression operations by predicting one channel of the audio data 21 based on another channel of the audio data 21.

Regardless of how the channels of the audio data 21 are arranged, the audio encoder 24 invokes a transform unit 100 to process the audio data 21. The transform unit 100 is configured to process the audio data 21 by, at least in part, applying a transform to a frame of the audio data 21 and thereby transform the audio data 21 from a time domain to a frequency domain to produce frequency domain audio data 112.

A frame of the audio data 21 may be represented by a predetermined number of samples of the audio data. In one example, a frame of the audio data 21 may be 1024 samples wide. Different frame widths may be chosen based on the frequency transform being used and the amount of compression desired. The frequency domain audio data 112 may be represented as transform coefficients, where the value of each of the transform coefficients represents an energy of the frequency domain audio data 112 at a particular frequency.

In one example, the transform unit 100 may be configured to transform the audio data 21 into the frequency domain audio data 112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 100 may include a fifty percent overlap window into a subsequent frame of audio data. The overlapped nature of an MDCT may be useful for data compression techniques, such as audio encoding, as it may reduce artifacts from coding at frame boundaries. The transform unit 100 need not be constrained to using an MDCT but may use other frequency domain transformation techniques for transforming the audio data 21 into the frequency domain audio data 112.

A subband filter 102 separates the frequency domain audio data 112 into subbands 114. Each of the subbands 114 includes transform coefficients of the frequency domain audio data 112 in a particular frequency range. For instance, the subband filter 102 may separate the frequency domain audio data 112 into twenty different subbands. In some examples, subband filter 102 may be configured to separate the frequency domain audio data 112 into subbands 114 of uniform frequency ranges. In other examples, subband filter 102 may be configured to separate the frequency domain audio data 112 into subbands 114 of non-uniform frequency ranges.

For example, subband filter 102 may be configured to separate the frequency domain audio data 112 into subbands 114 according to the Bark scale. In general, the subbands of a Bark scale have frequency ranges that are perceptually equal distances. That is, the subbands of the Bark scale are not equal in terms of frequency range, but rather, are equal in terms of human aural perception. In general, subbands at the lower frequencies will have fewer transform coefficients, as lower frequencies are easier to perceive by the human aural system.

As such, the frequency domain audio data 112 in lower frequency subbands of the subbands 114 is less compressed by the audio encoder 24, as compared to higher frequency subbands. Likewise, higher frequency subbands of the subbands 114 may include more transform coefficients, as higher frequencies are harder to perceive by the human aural system. As such, the frequency domain audio 112 in data in higher frequency subbands of the subbands 114 may be more compressed by the audio encoder 24, as compared to lower frequency subbands.

The audio encoder 24 may be configured to process each of subbands 114 using a subband processing unit 128. That is, the subband processing unit 128 may be configured to process each of subbands separately. The subband processing unit 128 may be configured to perform a gain-shape vector quantization process.

A gain-shape analysis unit 104 may receive the subbands 114 as an input. For each of subbands 114, the gain-shape analysis unit 104 may determine an energy level 116 of each of the subbands 114. That is, each of subbands 114 has an associated energy level 116. The energy level 116 is a scalar value in units of decibels (dBs) that represents the total amount of energy (also called gain) in the transform coefficients of a particular one of subbands 114. The gain-shape analysis unit 104 may separate energy level 116 for one of subbands 114 from the transform coefficients of the subbands to produce residual vector 118. The residual vector 118 represents the so-called "shape" of the subband. The shape of the subband may also be referred to as the spectrum of the subband.

An energy quantizer 106 may receive the energy level 116 of the subbands 114 and quantize the energy level 116 of the subbands 114 into a coarse energy 120 and a fine energy 122. As shown in the example of FIG. 2, the energy quantizer 106 may include a prediction/difference ("P/D") unit 130, a coarse quantization ("CQ") unit 132, a summation unit 134, and a fine quantization ("FQ") unit 136. The P/D unit 130 may predict or otherwise identify a difference between energy levels 116 for one of the subbands 114 and another one of the subbands 114 of the same frame of audio data (which may refer to spatial—in the frequency domain—prediction) or a same (or possibly a different) one of the subbands 114 from a different frame (which may be referred to as temporal prediction). The P/D unit 130 may analyze the energy levels 116 in this manner to obtain predicted energy levels 131 ("PEL 131") for each of the subbands 114. The P/D unit 130 may output the predicted energy levels 131 to the coarse quantization unit 132.

The coarse quantization unit 132 may represent a unit configured to perform coarse quantization with respect to the predicted energy levels 131 to obtain the coarse energy 120. The coarse quantization unit 132 may output the coarse energy 120 to the bitstream encoder 110 and the summation unit 134. The summation unit 134 may represent a unit configured to obtain a difference of the coarse quantization unit 134 and the predicted energy level 131. The summation unit 134 may output the difference as error 135 to the fine quantization unit 135.

The fine quantization unit 132 may represent a unit configured to perform fine quantization with respect to the error 135. The fine quantization may be considered "fine" relative to the coarse quantization performed by the coarse quantization unit 132. That is, the fine quantization unit 132 may quantize according to a step size having a higher resolution than the step size used when performing the coarse quantization, thereby further quantizing the error 135. The fine quantization unit 136 may obtain a fine energy 122 for each for the subbands 122 as a result of performing the fine quantization with respect to the error 135. The fine quantization unit 136 may output the fine energy 122 to the bitstream encoder 110.

In other words, the energy quantizer 106 may perform a two-step quantization process. The energy quantizer 106 may first quantize the energy level 116 with a first number of bits for a coarse quantization process to generate the coarse energy 120. The energy quantizer 106 may generate the coarse energy using a predetermined range of energy levels for the quantization (e.g., the range defined by a maximum and a minimum energy level. The coarse energy 120 approximates the value of the energy level 116.

The energy quantizer 106 may then determine a difference between the coarse energy 120 and the energy level 116. This difference is sometimes called a quantization error. The energy quantizer 106 may then quantize the quantization error using a second number of bits in a fine quantization process to produce the fine energy 122. The number of bits used for the fine quantization bits is determined by the total number of energy-assigned bits minus the number of bits used for the coarse quantization process. When added together, the coarse energy 120 and the fine energy 122 represent a total quantized value of the energy level 116.

A vector quantizer 108 may be configured to quantize the residual vector 118. In one example, the vector quantizer 108 may quantize the residual vector using a pyramid vector quantization (PVQ) process to produce the residual ID 124. Instead of quantizing each sample separately (e.g., scalar quantization), the vector quantizer 108 may be configured to quantize a block of samples included in the residual vector 118 (e.g., a shape vector). In some examples, the vector quantizer 108 may use a Linde-Buzo-Gray (LBG) algorithm to perform the vector quantization. A Linde-Buzo-Gray (LBG) algorithm typically results in less distortion with a fixed available bit-rate compared to scalar quantization. However, any vector quantization processes can be used along with the perceptual audio coding techniques of this disclosure.

For example, the vector quantizer 108 may use structured vector quantization algorithms reduce storage and computational complexity LGB algorithms. A structured vector quantization may involve performing the quantization based upon a set of structured code-vectors that do not need to be stored explicitly and can be identified functionally. Examples of the structured vector quantizers include Lattice vector quantizers and Pyramid Vector Quantizers (PVQ), as introduced in T. Fischer, "A pyramid vector quantizer," in *IEEE Transactions on Information Theory*, vol. 32, no. 4, pp. 568-583, July 1986. One example of how PVQ may be used is described in A. C. Hung, E. K. Tsern and T. H. Meng, "Error-resilient pyramid vector quantization for image compression," in *IEEE Transactions on Image Processing*, vol. 7, no. 10, pp. 1373-1386, October 1998.

Using PVQ, the vector quantizer 108 may be configured to map the residual vector 118 to a hyperpyramid (with constant L1 norm) or a hypersphere (with constant L2 norm) and quantize the residual vector 118 upon the underlying structured codebook. The quantization code-vectors are then enumerated and assigned an ID (e.g., the residual ID 124) to be encoded and transmitted. The quality of the mapping drives the accuracy of the quantization, while the number of enumeration code-vectors specifies the shape transmission rate.

Figure 3:
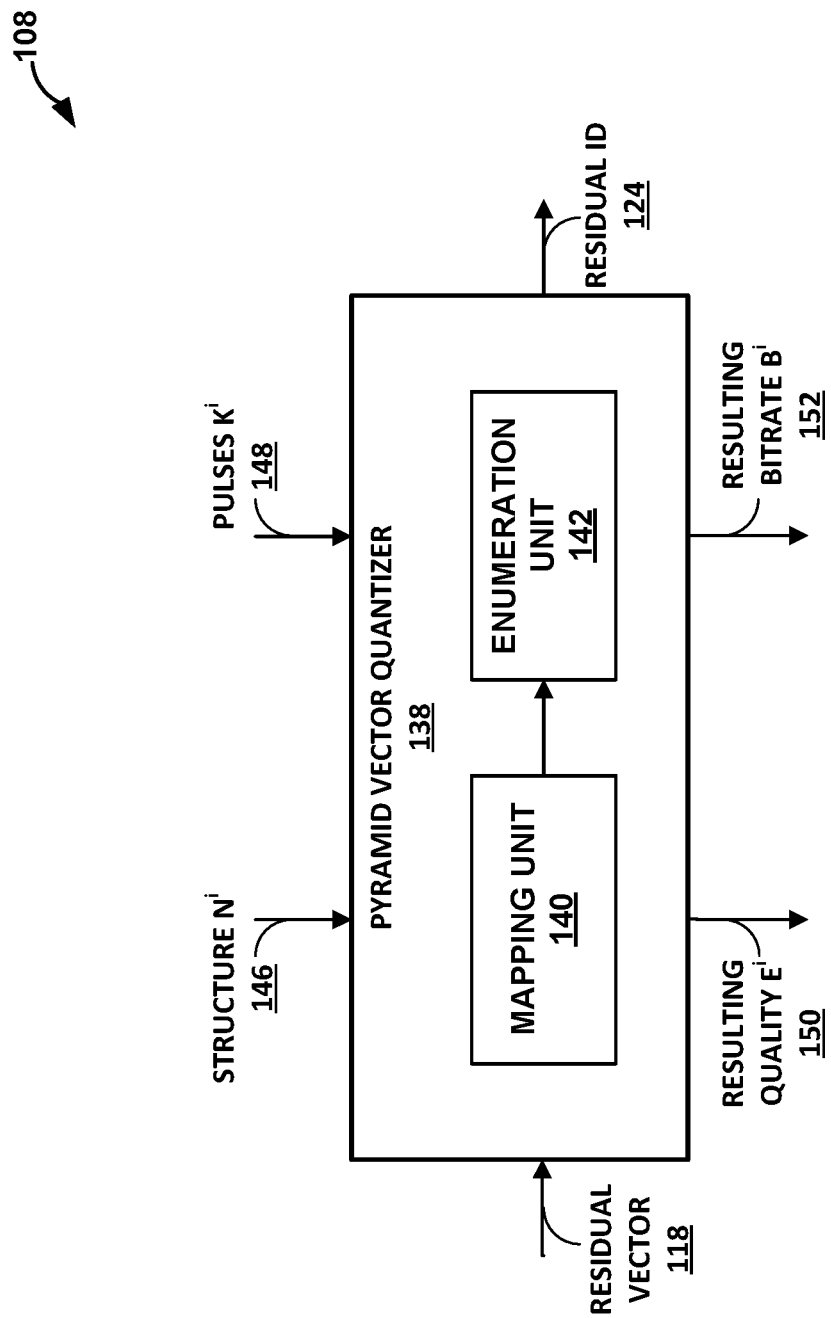
FIG. 3 is a block diagram illustrating an example vector quantizer configured to perform various aspects of the techniques described in this disclosure.

FIG. 3 is a block diagram illustrating an example vector quantizer 108 configured to perform various aspects of the techniques described in this disclosure. In particular, the vector quantizer 108 may include a pyramid vector quantizer 138 that is configured to perform pyramid vector quantization (PVQ) of residual vectors of audio data.

The residual vector 118 is input to the pyramid vector quantizer 138. As discussed above, the residual vector 118 is a residual vector of one of subbands 114 of frequency domain audio data. In operation, the pyramid vector quantizer 138 generates a residual ID 124 to encode the residual vector 118. As the residual vector 118 is a residual vector of one of subbands 114, the pyramid vector quantizer 138 may generate a separate residual ID 124 for each of the subbands 114 or vector quantizer 108 may include a separate pyramid vector quantizer 138 for each of the subbands 114. The assignment of residual IDs to the codevectors on the hypersurface may be a lossless process.

Figure 4:
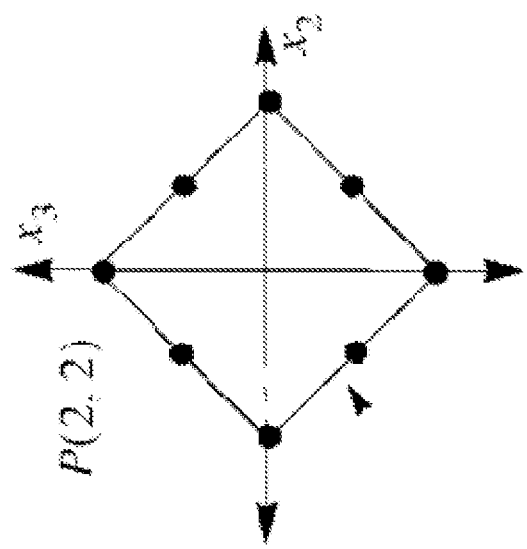
FIG. 4 is a diagram that illustrates an example hyperpyramid used for performing pyramid vector quantization.
Figure 4:
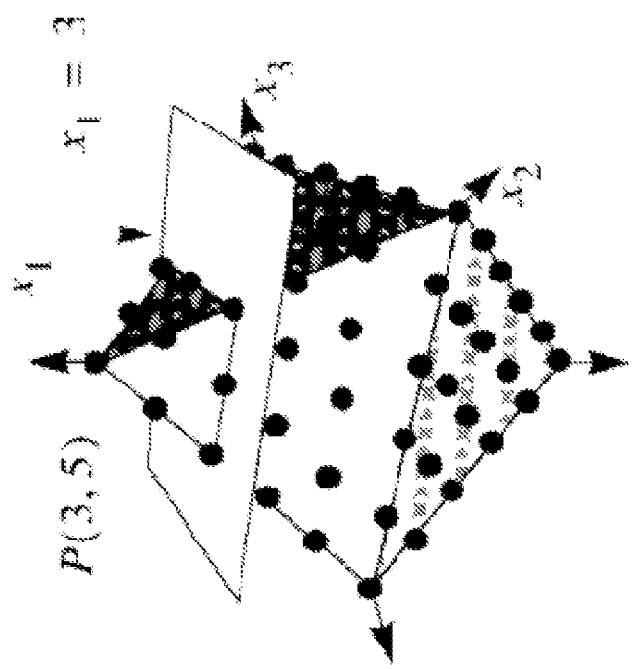

As shown in FIG. 3, the pyramid vector quantizer 138 includes a mapping unit 140 and an enumeration unit 142. To perform PVQ, the mapping unit 140 may map the residual vector 118 onto an N-dimensional hypersurface (e.g., a hyperpyramid) and the enumeration unit 142 may assign a unique identifier (ID) to each codevector on the hypersurface. The mapping of a residual vector may be parameterized by a structure N 146 and pulses K 148. The structure N 146 may represent the number of samples in the residual vector to be quantized (i.e., the number of samples in residual vector 118) and the pulses K 148 may represent the number of pulses to be included on the N-dimensional hypersurface. FIG. 4 is a diagram that illustrates an example hyperpyramid used for performing pyramid vector quantization. In the example of FIG. 4, the hyperpyramid had a structure N value of 3 and a pulses K value of 5.

The level of quantization of the residual vector 118, and thus the loss, is dependent on the number of pulses K 148 used for the subband. The number of pulses K 148 used for a subband is dependent on the number of bits allocated to encoding the residual vector in the subband. Subbands that are allocated higher numbers of bits may be encoded using more pulses, which may result in less distortion (i.e., loss) than subbands that are allocated lower numbers of bits.

The below equations illustrate the relationship between the number of transform coefficients in subband m (represented by $N_m$), the number of pulses used to encode the residual vector in subband m (represented by $K_m$), and the number of bits allocated to encode the residual vector in subband m (represented by $b_m$).

$$V_m \equiv V(N_m, K_m)$$

$$b_m \equiv \log_2 V_m$$

As such, the total number of bits needed to encode the residual vectors for all subbands is defined by the following equation.

$$B \equiv \sum_{m=1}^{M} b_m = \sum_{m=1}^{M} \log_2 V_m = \log_2 \prod_{m=1}^{M} V_m$$

Assume P defines a partition operator over transform space $N^i \equiv \{N_m^i\}_{m=1}^{M}$ with assigned PVQ pulses of $K^i \equiv \{K_m^i\}_{m=1}^{M}$ which correspond to a codebook length of $V^i \equiv \{V_m^i\}_{m=1}^{M}$. For any given mapping algorithm, each partition will result in a different PVQ with different performance.

The human ear has different sensitivities for distortion in different subbands. A level of distortion in one subband may be substantially more noticeable to a person than the same level of distortion in another subband. Therefore, it is desirable for the total bit budget of B to be allocated amongst the various subbands to achieve the lowest level of overall distortion (e.g., to achieve the highest level of overall quality). In equation form, assume resulting quality $E^i$ 150 is a distortion measure obtained by applying a distortion evaluation operator E on $P^i$, defined as:

$$P^i \equiv P(N^i, V^i)$$

Then $$E^i \equiv E(P^i)$$

As such, it is desirable to find a partition optimizing the measure:

$$P^* \equiv \underset{P^i}{\operatorname{argmin}} E^i$$

Returning to the example of FIG. 2, in some examples, the audio encoder 24 may dynamically allocate bits for coding the energy level 116 and the residual vector 118. That is, for each of subbands 114, the audio encoder 24 may determine the number of bits allocated for energy quantization (e.g., by the energy quantizer 106) and the number of bits allocated for vector quantization (e.g., by the vector quantizer 108). The total number of bits allocated for energy quantization may be referred to as energy-assigned bits. These energy-assigned bits may then be allocated between a coarse quantization process and a fine quantization process.

The audio encoder 24 may be further configured to encode the coarse energy 120, the fine energy 122, and the residual ID 124 using a bitstream encoder 110 to create the encoded audio data 25. The bitstream encoder 110 may be configured to further compress the coarse energy 120, the fine energy 122, and the residual ID 124 using one or more entropy encoding processes. Entropy encoding processes may include Huffman coding, arithmetic coding, context-adaptive binary arithmetic coding (CABAC), and other similar encoding techniques. The encoded audio data 25 may then be transmitted to the sink device 14 and/or stored in a memory for later use, as noted above.

As described above, the audio encoder 24 (which may represent one example of an audio encoding device) may allocate a number of bits for coarse quantization, fine quantization and vector quantization. In some examples, the total number of bits for fine and coarse energy quantization and vector quantization may be allocated based on a target compression ratio and/or bitrate for transmitting the encoded audio data 25.

However, the desired compression ratio and/or bitrate for transmitting the encoded audio data 25 may change over time due to environmental factors. For example, a link over which a bitstream representative of the encoded audio data 25 is transmitted may degrade or improve in terms of available bandwidth due to congestion, interference, or other environmental factors. Adapting the encoding to account for the changing compression ratio and/or bitrate while ensuring adequate perceptual quality (or, in other words, not injecting audio artifacts) may be difficult, as changing quantization may expose quantization noise that was previously determined to be imperceptible.

To improve perceptual quality in the context of bitrate adaptive audio encoding, the audio encoder 24 may attempt to implement perceptual models. Perceptual models are, however, complex (in terms of processing and/or memory resource consumption) and may not adequately address the difficulties associated with quantization noise, e.g., only shaping the quantization noise, rather than ensuring final perceptual quality is adequate.

In accordance with various aspects of techniques described in this disclosure, the audio encoder 24 may implement perceptual audio coding using sequential decision making. Sequential decision making refers to a way by which to frame the perceptual audio coding in the context of dynamic bit allocation. Rather than attempt to recreate a full psychoacoustic model to ensure perceptual quality, the dynamic bit allocation is reduced to a sequential decision making problem, where actions regarding bit distributions across subbands are evaluated and updated sequentially to achieve a target bitrate for current environmental conditions.

Once the perceptual audio coding is framed as a sequential decision making problem, artificial intelligence algorithms may be identified by which to address the sequential decision making problem. For example, the perceptual audio encoder may determine bit distributions across the subbands using semi-supervised machine learning algorithms.

Semi-supervised machine learning algorithms may refer to a class of learning algorithms that make use of implicitly labeled data during model training. Labeled data may refer to training data that also includes metadata in the form of tags (or, in other words, labels) that are descriptive of various aspects of the training data. Unlabeled data, in contrast, may consist solely of the training data without any accompanying tags (or, in other words, labels) that are descriptive of various aspects of the training data. Semi-supervised machine learning algorithms may include only an implicit metadata of the training data (relative to the amount of unlabeled training data). Reliance on a small amount of implicitly labeled training data in conjunction with relatively larger amounts of unlabeled training data may improve learning accuracy where explicitly labeled data is unavailable or very costly to acquire.

An example of semi-supervised machine learning algorithms suitable for perceptual audio coding in terms of addressing the bit distribution framed as a sequential decision making problem is a reinforcement learning (RL) algorithm. A specific class of reinforcement learning algorithms may include an actor (which may also be referred to as an agent) that performs actions in an environment so as to maximize expected reward (or, in other words, minimize punishment).

Two main motivations may drive use of reinforcement learning in this context: 1—reinforcement learning may facilitate incorporation of sophisticated psychoacoustic, and cognitive models in the learning process of audio data compression; and 2—reinforcement learning may capture frame-wise dependencies to ensure the most efficient compression, highest perceptual quality, and effective responses to unpredictable, ever-changing external conditions of streaming.

Supervised and unsupervised machine learning techniques may be used when the appropriate data from which to learn is available. In supervised learning, the learning data may be explicit. For example, the data for supervised learning may be explicitly labeled (e.g., data that includes explicitly what is the optimal action to take in a given state, in this context), or explicitly characterized in terms of distortion, for example if there are data available indicating that if an action in a given state is selected, how it will change the distortion or reconstruction error.

In unsupervised learning, a high-level criterion may be defined such that it can guide the learning in a trajectory of improving quality or compression efficiency. Such a criterion would be the most complicated to design, but would not require any costly training data. As such, unsupervised learning may adapt only by observing the state samples.

In semi-supervised learning, one example goal is to make use of any available direct data, and at the same time not require explicit labels or distortion measures that could be costly to obtain, or simply not available. Semi-supervised learning may use any learning feedback from observing data that is available, and leaves the rest for the intelligence of the learning model to adapt without supervision, so it falls in between the two extremes of supervised and unsupervised learning.

Sequential decision-making frameworks, such as reinforcement learning, may make it possible to incorporate and model sequential effects of actions rather than only relying on training in each frame independently, as is the case with conventional coding methods. As psychoacoustic and cognitive models are complicated to be explicitly used as training data, these models may simply be used to define the reward function and the semi-supervised nature of the reinforcement learning will conduct the adaptation. The perceptual and cognitive feedback may represent the semi-supervised information we have in the training, in the specific category of perceptual coding, and then the reinforcement learning becomes the suitable option. In some instances, the learning can be supervised, or unsupervised, but then the learning process should also be redefined accordingly, based on a distortion or explicit error reconstruction measure in supervised learning, or a higher-level quality/compression criterion in unsupervised learning.

In the context of determining bit distributions, the actions refer to allocation, re-allocation, and/or transpositions of bits across the subbands. The rewards in this context include feedback from several factors, including network conditions, streamlining rate, perceptual and cognitive models, scalability request fulfilments, robustness events, reliability events, etc. A critic (which may also be referred to as an interpreter) may summarize the feedback and derive the temporal difference (TD) error according to the received reward and state-value function. The actor may utilize the current state and policy function to select a subsequent action. Actor and critic are updated based on the TD error.

The RL agent may include an action selection policy that determines the current action, once the current state is observed, based on its state-/state-action-value function. The RL agent may execute the selected action, which transitions the compression to a next state, and receives the reward as a consequence of the selected action in the observed state. The transition, along with its consequence in the form of reward, and the selected action that drove the reward, are utilized by the RL agent to update its state-/state-action-value function. Examples include Q-Learning, SARSA, Actor-Critic, deep RL frameworks such as deep Q-network (DQN), model-free vs. model-based, batch vs. online variants as introduced in Richard S. Sutton, and Andrew G. Barto, *Reinforcement Learning: An Introduction*, Second Edition, MIT Press, Cambridge, Mass., 2017. In this context, for encoder/decoder recall and updating synchronization reasons, having separated representations of state-value and policy functions makes actor-critic methods the suitable choice.

As further shown in the example of FIG. 2, the subband processing unit 128 includes a bit allocator 200 that utilizes a controller 202 (which may also represent, as one example, a model) implementing the actor-critic framework described above. The actors, in this framework, may receive the rewards and select a different subset of actions in an attempt to maximize future rewards. The controller 202 may iterate in this manner within a stable environment until rewards are maximized. The controller 202 may continue to learn based on the actions and rewards (which may be considered equivalent to the implicit labels) to further refine the controller 202.

Although any type of reinforcement learning algorithm may be chosen to address determination of bit distributions or subband-wise bit transpositions framed as a sequential decision making problem, the reinforcement learning algorithms that result in a controller 202 that separate the actor from the critic may promote more efficient bitstreams (in terms of overhead dedicated to ensuring synchronization between the perceptual audio encoder and the perceptual audio decoder). That is, the perceptual audio encoder 24 and the perceptual audio decoder 44 may maintain synchronization to facilitate decoding of the encoded audio data 25. When the actor is separate from the critic and the feedback is uniformly defined, the encoder 24 and decoder 44 may identify the same reward, and thereby derive the same bit distributions without having to signal how many bits are used for representing each of the subbands.

In this respect, the bit allocator 200 may adapt a controller 202 according to a semi-supervised machine learning algorithm. The controller 202 may determine the bit distributions for the energy levels 116 (e.g., energy bit allocations—EBA—203) and the residual vectors 118 (e.g., shape bit allocations—SBA—205). In examples where the semi-supervised machine learning algorithm includes a reinforcement learning algorithm, the controller 202 may adapt based on some form of reinforcement provided to the controller 202, such as the above noted reward.

In the actor-critic machine learning algorithm subset of the reinforcement learning algorithms, the controller 202 may map the state observed by the critic to one of a plurality of actions and perform one of the actions to modify the current bit distribution in an attempt to maximize the expected reward. The modification of the bit distribution may effectively transpose bits across subbands. Universal function approximators may be used to represent this mapping, and spatio-temporal representations may be used to incorporate the current bit distribution status along with incoming transform vector. Separating the actor from the critic may allow for less overhead in the bitstream in order to maintain synchronization (with respect to determining bit distributions across subbands) between the encoder 24 and the decoder 44.

In operation, the bit allocator 200 may interface with the controller 202 to determine the energy bit allocation 203 and the shape bit allocation 205. The bit allocator 200 may output the energy bit allocation 203 to the fine quantization unit 136, and the shape bit allocation 205 to the vector quantizer 108. The fine quantization unit 136 may then obtain, based on the energy bit allocation 203, an appropriate step size by which to quantize the error 135 that results in the closest (in terms of error) approximation of the error 135. The vector quantizer 108 may obtain, based on the shape bit allocation 205, an appropriate number of pulses that results in the closest (in terms of error) approximation of the residual vector 118.

The resulting coarse energy 120, fine energy 122, and residual ID 124 may represent one or more indications representative of the subbands 114 of the audio data 21. The energy quantizer 106 and vector quantizer 108 may obtain these indications based on the corresponding energy bit allocations 203 and the shape bit allocations 205. As such, the bitstream encoder 110 may effectively specify, based on the energy and shape bit allocations 203 and 205 and in a bitstream 25 (shown as the encoded audio data 25) representative of the audio data 21, the one or more indications 120, 122, and 124. The bitstream encoder 110 may output the bitstream 25 via a wireless connection in accordance with the wireless communication protocol as described above with respect to the example of FIG. 1.

The bit allocator 200 may then assess the current environment in the manner described below in more detail in order to obtain a reward. The current environment may include one or more of a current state, a next state, a condition of the wireless connection, a streamlining rate, an output from a perceptual model, an output from a cognitive model, a scalability request fulfillment, a robustness event, and a reliability event. The bit allocator 200 may adapt the controller 202 based on the reward to adjust how a current state maps to a subsequent action taken with respect to the bit allocations 203 and 205. In this way, the techniques may allow the bit allocator 200 to continue to adapt or otherwise refine the controller 202 to maximize the reward and achieve better compression and/or signal-to-noise ratio (SNR) in order to promote better perceptual audio quality.

More detail regarding operation of the bit allocator 200 is described below with respect to the examples of FIGS. 5 and 8. Further information regarding the synchronization between the audio encoder and decoder is provided below when discussing FIGS. 7 and 8.

Figure 5:
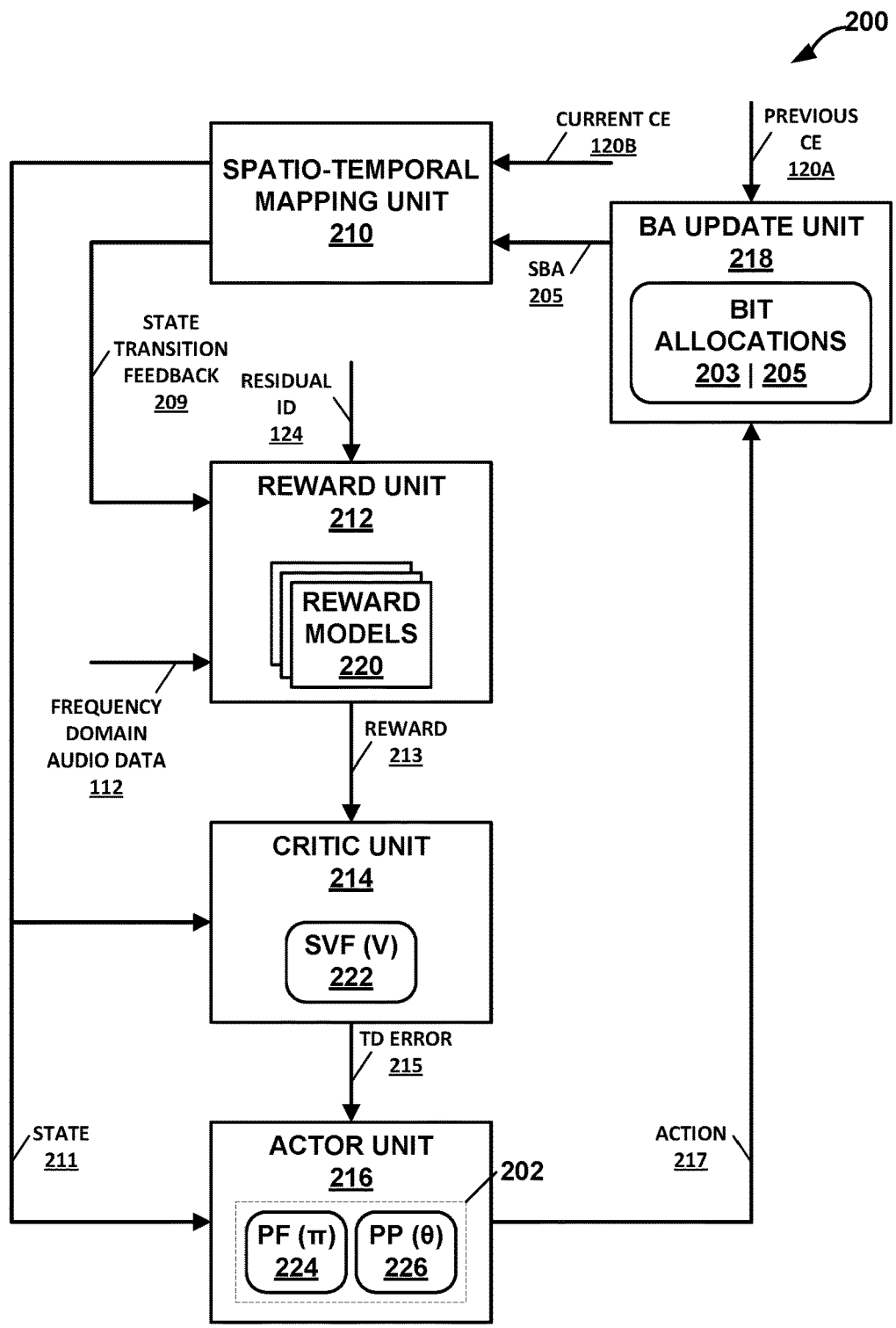
FIG. 5 is a block diagram illustrating the bit allocator shown in the example of FIG. 2 in more detail.

FIG. 5 is a block diagram illustrating the bit allocator 200 shown in the example of FIG. 2 in more detail. In the example of FIG. 5, the bit allocator 200 includes a spatio-temporal mapping unit 210, a reward unit 212, a critic unit 214, an actor unit 216 representative of the controller 202, and a bit allocation ("BA") update unit 218.

The spatio-temporal mapping unit 210 may represent a unit configured to determine a next state 211 representative of the current environmental conditions in which the audio encoder 24 is operating. The spatio-temporal mapping unit 210 may assess the environment using any number of processes or based on any number of metrics. The spatio-temporal mapping unit 210 may, for example, consider a signal-to-noise ratio (SNR) of the wireless connection, a noise or interference level, an error rate, a retransmission rate, and the like.

The spatio-temporal mapping unit 210 may consolidate all the incoming state observations with the current status of compression, forming a unique state representation. The state representation is assumed, in this example, to be fully observable, and contains sufficient information to devise, learn, and apply an optimal action. The optimal action may refer to an action that achieves a greatest reward. The consolidation may require a recursive model to include, in the observation vector, the current status of the compression that was modified by the previously selected action. Examples of the models include recursive networks, spatio-temporal networks, sequence models, and frameworks integrating spatial aspects of state with those of temporal. Examples of representations include discriminative audio features across frames, audio spectral variations, bit allocation changes, etc. For example, current quantized coarse energy value in the context of gain-shape quantization as temporal features may be incorporated into a spatio-temporal representation consisting of the current bit distribution vector as spatial features.

The spatio-temporal mapping unit 210 may determine the current state 211 based on the assessment of the environment, a next coarse energy 120B ("current CE 120B") and a shape bit allocation 205. For example, the spatio-temporal mapping unit 210 may map quantized CE, along with current bit allocation onto a consolidated state representation from which an optimal action can be drawn by the actor policy function. Further spatial and temporal features, and environmental factors on which the optimal action depends, can form further elements of the state observation vector. The spatio-temporal mapping unit 210 may output the current state 211 to the actor unit 216. The spatio-temporal mapping unit 210 may also determine state transition feedback 209 as how the new bit allocation has affected the environment, transitioning from previous state of the compression. The spatio-temporal mapping unit 210 may output this state transition feedback 209 to the reward unit 212.

The reward unit 212 may represent a unit configured to determine a reward 213 or other form of reinforcement. The reward unit 212 may determine the reward 213 based on frequency domain audio data 112, residual ID 124, state transition feedback 209, and reward models 220. The reward models 220 may represent one or more of any type of model capable of modeling various aspects of the audio data, such as a cognitive model, a psychoacoustic model, and/or a distortion model (where such models should be understood in the context of hearing science, psychoacoustics, audio cognition, speech, and computer science algorithms for cognitive, psychoacoustic and/or distortion modeling). The reward models 220 may output various indications of the different aspects of the audio data on which the reward unit 212 may base the determination of the reward 213. The reward unit 212 may output the reward 213 to the critic unit 214.

The critic unit 214 may represent a unit configured to determine a temporal difference error 215 ("TD error 215"). The critic unit 214 may compute the TD error 215 based on a state-value function (SVF) 222, which may be denoted by the function $V(*,*)$. For example, the critic unit 214 may compute the TD error 215 according to the following equation:

$$\delta \leftarrow R_{t-1} + \gamma V(s_t, w) - V(s_{t-1}, w),$$

where $\delta$ denotes the TD error 215, $R_{t-1}$ denotes the immediate reward 213 received from the previous frame, $\gamma$ denotes the discount rate where $\gamma \in [0,1)$, $s_t$ denotes the current state 211, while $s_{t-1}$ denotes the previous state, and w denotes the current state-value weights. With discounting, the agent optimizes the discounted expected return by weighing recent rewards more than the future rewards in action selection. The critic unit 214 may output the TD error 215 to the actor unit 216.

The critic unit 214 may also adapt the controller 202 indirectly by changing one or more of the state-value weights based on the TD error 215 (which indirectly adapts the controller 202 as it impacts computation of the TD error 215). For example, the critic unit 214 may obtain new weight values according to the following equation:

$$w \leftarrow w + \alpha^w \delta \nabla_w V(s_{t-1}, w),$$

where $\alpha^w$ denotes the state-value weight learning step-size and $\nabla_w$ denotes gradient with respect to w.

In any event, the actor unit 216 may represent a unit configured to select, based on the current state 211, an action 217 to take with respect to existing bit allocations 203 and 205 across the subbands 114. The actor unit 216 may also adapt, responsive to receiving the TD error 215, the controller 202, which may include a policy function (PF) 224 configured according to policy parameters (PP) 226. The policy function 224 may be denoted by the function $\pi(*|*,*)$, and the policy parameters 226 may be denoted by the variable $\theta$. The actor unit 216 may update the policy parameters 226 according to, as one example, the following equation:

$$\theta \leftarrow \theta + \alpha^\theta \delta \nabla_\theta \ln \pi(a_{t-1}|s_{t-1}, \theta),$$

where $\alpha^\theta$ denotes the policy gradient step-size, $\nabla_\theta$ denotes gradient with respect to $\theta$, and $a_{t-1}$ denotes the action selected in the previous frame.

The actor unit 216 may then apply the policy function 224 (adapted according to the updated policy parameters 226) with respect to the current state 211 in order to obtain the action 217. The action 217 may indicate how to update the bit allocations 203 and 205 in an attempt to promote more efficient perceptual audio encoding. The various updates to the state-value weights and the policy parameters 226 may be delayed one or more frames to allow for the above noted synchronization. In any event, the actor unit 216 may provide the action 217 to the bit allocation (BA) update unit 218.

The bit allocation update unit 218 may represent a unit configured to update, based on a previous (e.g., time (t) minus one—t−1) coarse energy 120A and the action 217, the bit allocations 203 and 205. The action 217 may identify how many bits should be allocated to the gain and shape for each of the subbands 114 in terms of changes to the existing bit allocations 203 and 205 or as the total number of bits allocated to each of the gain and shape for each of the subbands 114. Regardless, the bit allocation update unit 218 may update the bit allocations 203 and 205 to achieve better perceptual audio encoding (e.g., relative to a previous frame). The bit allocator 200 may continue in this manner, processing successive frames of the audio data, and adapting the controller in an effort to achieve better perceptual audio coding.

Figure 6:
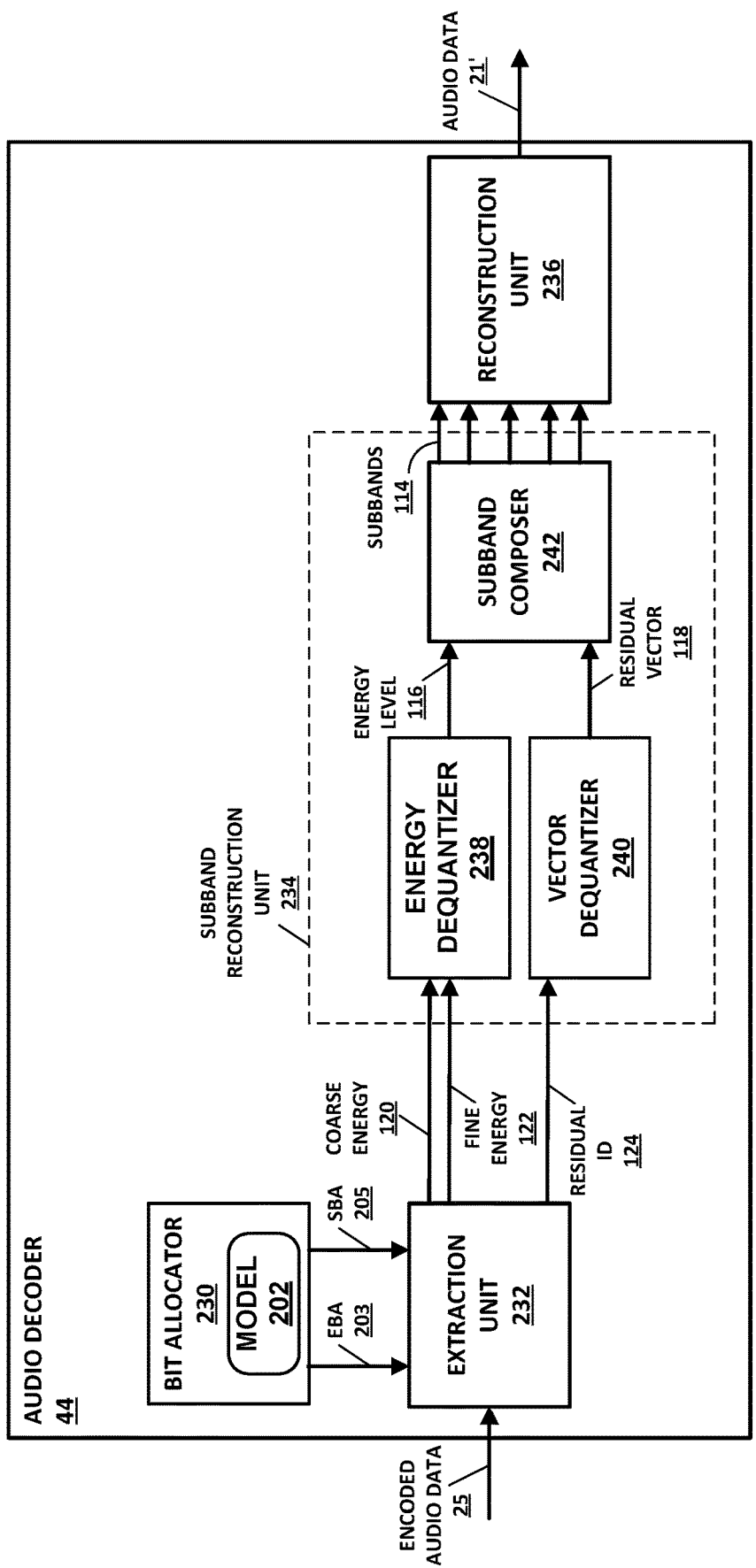
FIG. 6 is a block diagram illustrating the audio decoder of FIG. 1 in more detail.

FIG. 6 is a block diagram illustrating the audio decoder of FIG. 1 in more detail. As shown in the example of FIG. 6, the audio decoder 44 includes a bit allocator 230, an extraction unit 232, a subband reconstruction unit 234, and a reconstruction unit 236. The bit allocator 230 may operate similar to and possibly substantially the same as the bit allocator 200, implementing a similar if not the same controller 202 in synchronization (relative to the encoded audio data 25) with the controller 202 of the bit allocator 200. As such, the bit allocator 230 may output energy bit allocation (EBA) 203 and shape bit allocation (SBA) 205, providing the energy bit allocation 203 and the shape bit allocation 205 to the extraction unit 232.

The extraction unit 232 may represent a unit configured to extract the coarse energy 120, the fine energy 122, and the residual ID 124 from the encoded audio data 25. The extraction unit 232 may extract, based on the energy bit allocation 203, one or more of the coarse energy 120 and the fine energy 122. The extraction unit 232 may extract, based on the shape bit allocation 205, the residual ID 124. The extraction unit 232 may output the coarse energy 120, the fine energy 122 and the residual ID 124 to the subband reconstruction unit 234.

The subband reconstruction unit 234 may represent a unit configured to operate in a manner that is reciprocal to the operation of the subband processing unit 128 of the audio encoder 24 shown in the example of FIG. 2. The subband reconstruction unit 234 may, in other words, reconstruct the subbands from the coarse energy 120, the fine energy 122, and the residual ID 124. The subband reconstruction unit 234 may include an energy dequantizer 238, a vector dequantizer 240, and a subband composer 242.

The energy dequantizer 238 may represent a unit configured to perform dequantization in a manner reciprocal to the quantization performed by the energy quantizer 106. The energy dequantizer 238 may perform dequantization with respect to the coarse energy 122 and the fine energy 122 to obtain the predicted/difference energy levels, on which the energy dequantizer 238 may perform inverse prediction or difference calculations to obtain the energy level 116. The energy dequantizer 238 may output the energy level 116 to the subband composer 242.

The vector dequantizer 240 may represent a unit configured to perform vector dequantization in a manner reciprocal to the vector quantization performed by the vector quantizer 108. The vector dequantizer 240 may perform vector dequantization with respect to the residual ID 124 to obtain the residual vector 118. The vector dequantizer 240 may output the residual vector 118 to the subband composer 242.

The subband composer 242 may represent a unit configured to operate in a manner reciprocal to the gain-shape analysis unit 104. As such, the subband composer 242 may perform inverse gain-shape analysis with respect to the energy level 116 and the residual vector 118 to obtain the subbands 114. The subband composer 242 may output the subbands 114 to the reconstruction unit 236.

The reconstruction unit 236 may represent a unit configured to reconstruct, based on the subbands 114, the audio data 21'. The reconstruction unit 236 may, in other words, perform inverse subband filtering in a manner reciprocal to the subband filtering applied by the subband filter 102 to obtain the frequency domain audio data 112. The reconstruction unit 236 may next perform an inverse transform in a manner reciprocal to the transform applied by the transform unit 100 to obtain the audio data 21'.

In this way, the audio decoder 44 may adapt the controller 202 according to a semi-supervised machine learning algorithm, the controller configured to determine bit distributions (or, in other words, bit allocations 203 and 205) across the subbands 114 of transformed audio data 25. The audio decoder 44 may then obtain, based on the bit allocation 203 and 205 and from the bitstream 25 (which may also be referred to as encoded audio data 25), the subbands 114 of the transformed audio data 25. The audio decoder 44 may next obtain, based on the subbands 114 of the transformed audio data, the transformed audio data. The audio decoder 44 may apply an inverse transform to the transformed audio data to obtain the audio data 21'.

Figure 7:
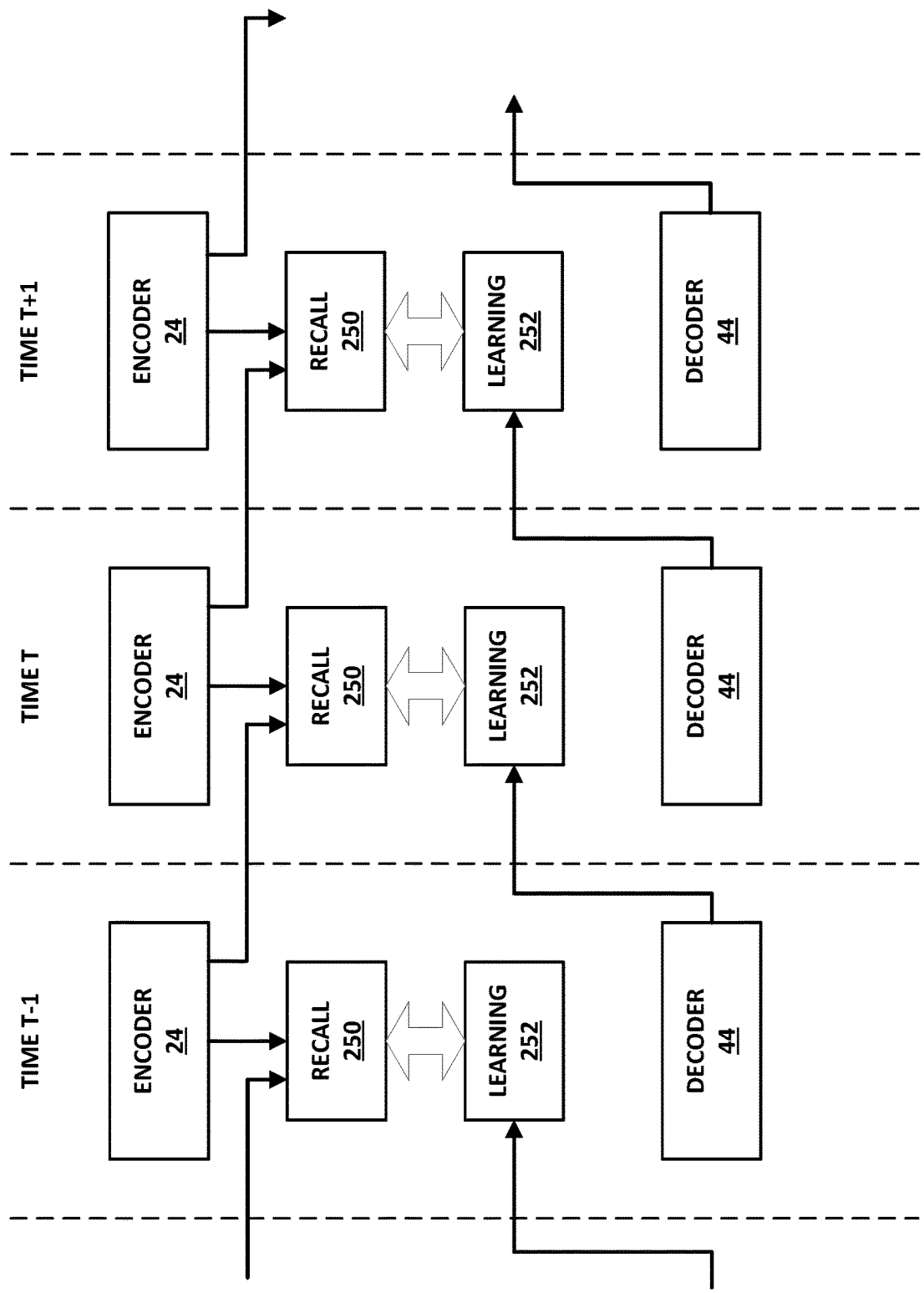
FIG. 7 is a block diagram illustrating synchronization between the audio encoder and the audio decoder in accordance with various aspects of the techniques described in this disclosure.

FIG. 7 is a block diagram illustrating synchronization between the audio encoder 24 and the audio decoder 44 in accordance with various aspects of the techniques described in this disclosure. As shown in the example of FIG. 6, the audio encoder 24 may interact with recall aspects of the controller 202 (shown as "recall 250") over time, where the encoder 24 at time t−1 (which may denote a previous frame to a current frame at time, t) may interact both with the recall 250 at time t−1 and at time t, providing the above noted inputs in order to obtain the action 217 (FIG. 5). Likewise, the encoder 24 at time t may interact with the recall 250 at time t and at time t+1 (denoting a subsequent frame).

The audio decoder 44 may defer update to learning aspects of the controller 202 (shown as "learning 252") by one frame in order to allow both the encoder 24 and the decoder 44 to maintain synchronization. The audio encoder 24 may update the learning 252 immediately as the encoder 24 has access to all of the various frames, whereas the audio decoder 44 may only have access, in certain streaming contexts, to the current frame. As such, the audio encoder 24 may defer updates to the learning 252 by one (or more) frame(s) so as to maintain synchronization with the audio decoder 44.

Figure 8:
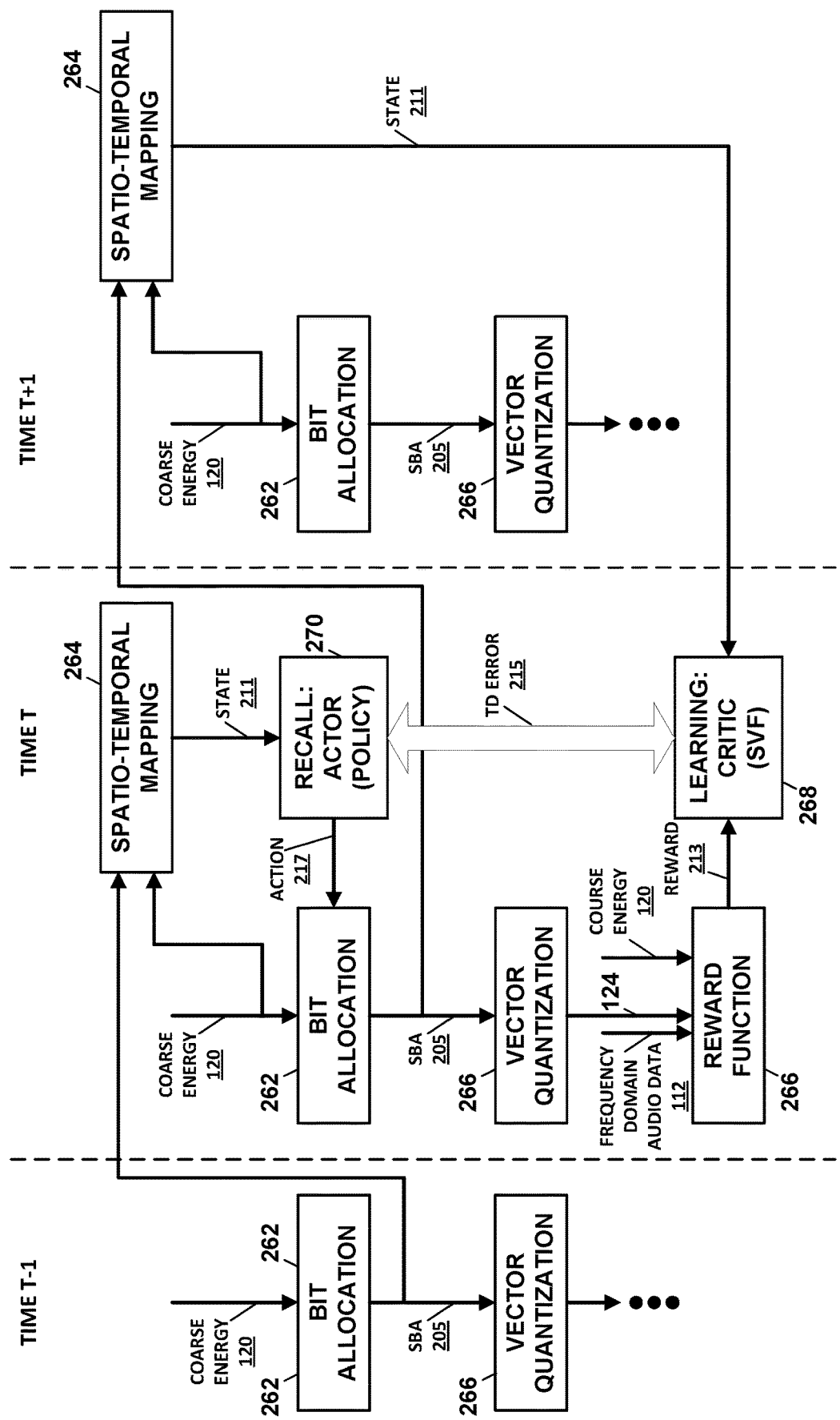
FIG. 8 is a block diagram illustrating operation of the audio encoder shown in FIGS. 1 and 2 to maintain the controller in a manner that allows for synchronization with the audio decoder in accordance with various aspects of the techniques described in this disclosure.

FIG. 8 is a block diagram illustrating operation of the audio encoder shown in FIGS. 1 and 2 to maintain the controller in a manner that allows for synchronization with the audio decoder in accordance with various aspects of the techniques described in this disclosure. As shown in the example of FIG. 8, the bit allocation 200 of the audio encoder 24 may first perform, based on the coarse energy 120 for time T−1, bit allocation (262) at time T−1 to determine the shape bit allocation 205 for time T−1, which is provided for use in performing spatial temporal mapping (264) at time T.

The audio encoder 24 may perform spatial temporal mapping (264) at time T based on the shape bit allocation 205 for time T−1 and the coarse energy 120 for time T to obtain the state 211. The audio encoder 211 may implement the recall functionality (which may refer to the recall: actor or policy 270 aspects of the controller 202) based on the state 211 to obtain the action 217. The audio encoder 24, at time T, may then update the bit allocation based on the action 217, and perform the bit allocation 262, based on the coarse energy 120, to obtain the shape bit allocation 205 for time T, which is used during vector quantization 266 at time T and for spatio-temporal mapping at time T+1.

The audio encode 24 may perform, based on the shape bit allocation 205 for time T−1, the vector quantization 266, to obtain the residual ID 124. Using one or more of the residual ID 124 for time T, the frequency domain audio data 112 for time T, and the coarse energy 120 for time T as an input into the reward function (266), the audio encoder 24 may obtain the reward 213. The audio encoder 24 may then perform, based on the reward 213 computed for time T and the state 211 determined at time T+1, learning aspects (268) of the controller 202 (which may also refer to the critic functionality defined by the state-value function) to obtain the TD error 215. Using the TD error 215, the audio encoder 24 may update the controller 202 (the learning and/or recall functionality) to adapt mapping of the states 211 to the actions 217 in an effort to improve the perceptual quality of the audio data 21' reconstructed at the audio decoder 44. Although time is denoted by a capital 'T' in this and other examples, time may also be denoted by a lower-case 't' as shown below and elsewhere.

The foregoing may be represented by the following pseudocode:

```
Input: state space S = {∀s ≈ s | s ∈ R^N}, action space
A = {∀a ≈ a | a ∈ R^M}
Input: a policy function approximator π(a | s, θ)
Input: a state-value function approximator V(s,w)
Parameters: policy gradient step-size α^θ > 0, value weight learning step-size α^w > 0
Initialize: policy parameters θ ∈ R^d', and state-value weights w ∈ R^d
Initialize: action selection policy, learning rate.
t = 0
   Capture: first audio input frame y_0
   Transform: input frame y_0 into transform domain x_0
   Analyze: gain-shape and compute energy scalar and shape, in each subband
   Quantize: energy scalar to E_0
   Allocate: bits on each subband for vector quantization and obtain bit distribution b_0
   Initialize: state s_0, through spatio-temporal map
   Observe: s_0 in state s_0 as s_0 = E_0 ⊕ b_0
   Derive: action a_0: π(. | s_0, θ)
   Apply: action a_0 onto bit distribution b_0, obtain b_1
   Vector-Quantize: energy-normalized transform vectors into residuals r_0,
using b_1
   Capture: next audio input frame y_1
   Transform: input frame y_1 into transform domain x_1
   Analyze: gain-shape and compute energy scalar and shape, in each subband
   Quantize: energy scalar to E_1
   Observe: next state s_1 in state s_1, through spatio-temporal map as s_1 = E_1 ⊕ b_1
   Receive: Immediate reward from psychoacoustic, cognitive, distortion model as R_0
   Transition: current state s_0 to next state s_1
   for t = 1, 2, ... do
      Derive: action a_t: π(. | s_t,θ)
      Apply: action a_t onto bit distribution b_t, obtain b_{t+1}
      Vector-Quantize: energy-normalize trans. vectors into residuals r_t,
using b_{t+1}
      Capture: next audio input frame y_{t+1}
      Transform: input frame y_{t+1} into transform domain x_{t+1}
      Analyze: gain-shape and compute energy scalar and shape, in each subband
      Quantize: energy scalar to E_{t+1}
      Observe: next state s_{t+1} in state s_{t+1}, spatio-temporal map as s_{t+1} = E_{t+1} ⊕ b_{t+1}
      Receive: reward from psychoacoustic, cognitive, distortion model as R_t
      Compute: temporal difference error
      Update: policy and state-value with one frame lag
      δ ← R_{t-1} + γ.V(s_t, w) − V(s_{t-1},w)
      w ← w + α^w δ∇_w V(s_{t-1},w)
      θ ← θ + α^θ δ∇_θ ln π(A_{t-1} | s_{t-1}, θ)
      Transition: current state s_t to next state s_{t+1}
      t := t + 1.
   end for.
   Return: actor (policy) and critic (value).
```

In the foregoing pseudocode, the Vectors and Matrices are shown in bold, non-italic (including parameter vector "\theta," action vector "a," and state vector "s"). Scalars, variable and functions are shown in non-bold, italic (including variable "\alpha," variable "\delta," and function "\pi"). Special functions are shown above as simple text, non-bold, non-italic (including special function "ln").

Figure 9A:
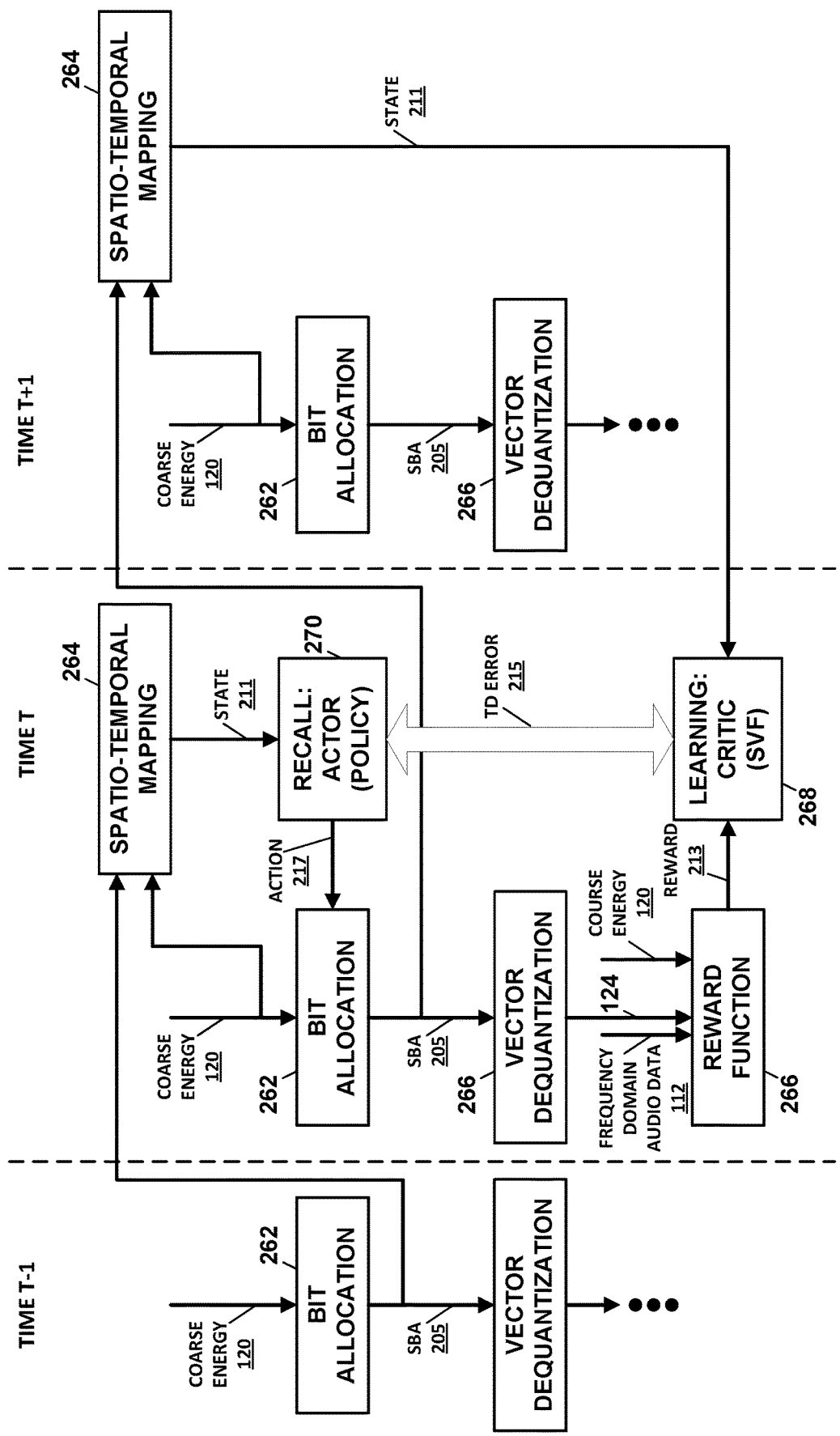
FIG. 9A-9C are block diagrams illustrating operation of the audio decoder shown in FIGS. 1 and 6 to maintain the controller in a manner that allows for synchronization with the audio encoder in accordance with various aspects of the techniques described in this disclosure.
Figure 9B:
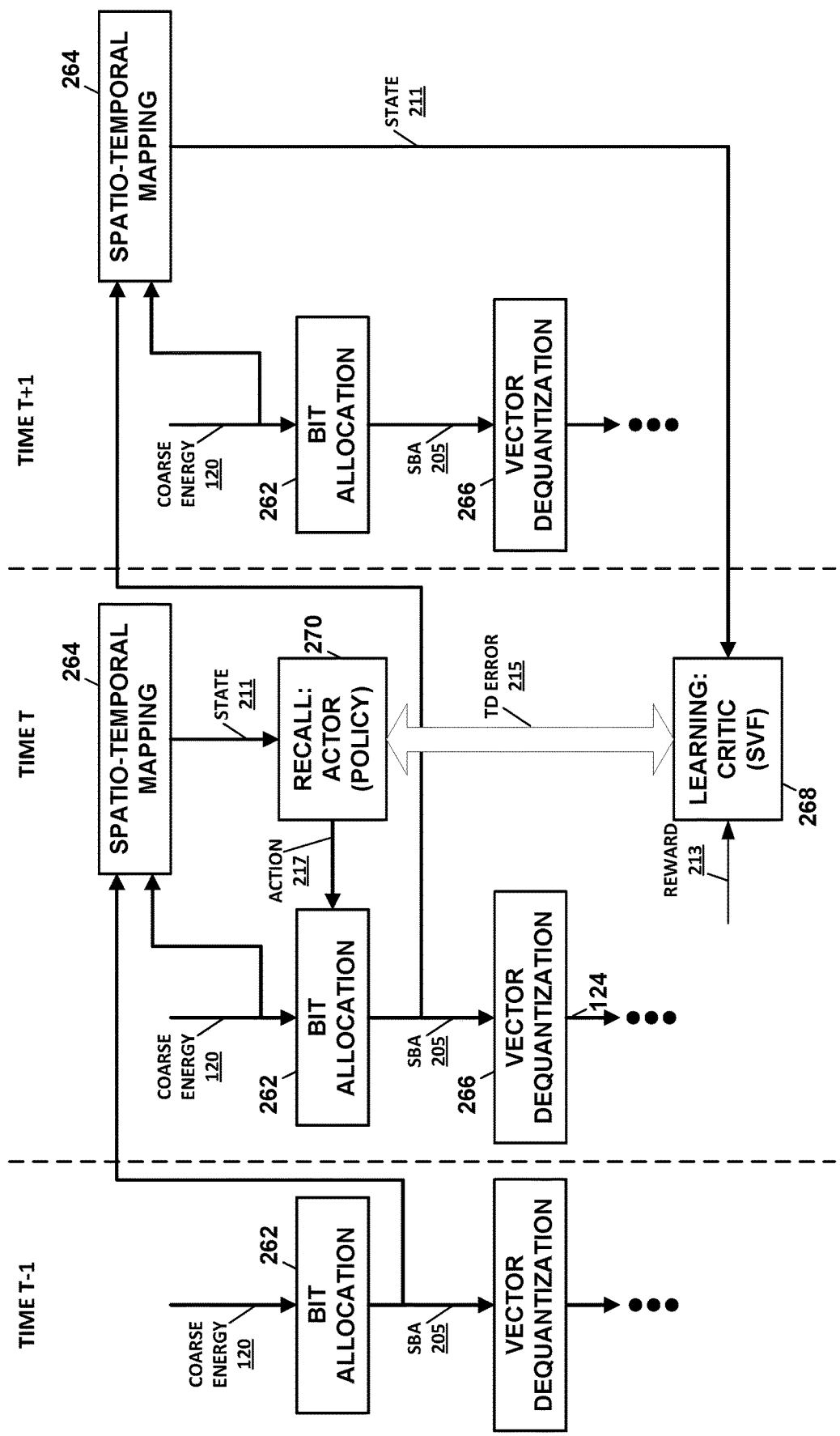
Figure 9C:
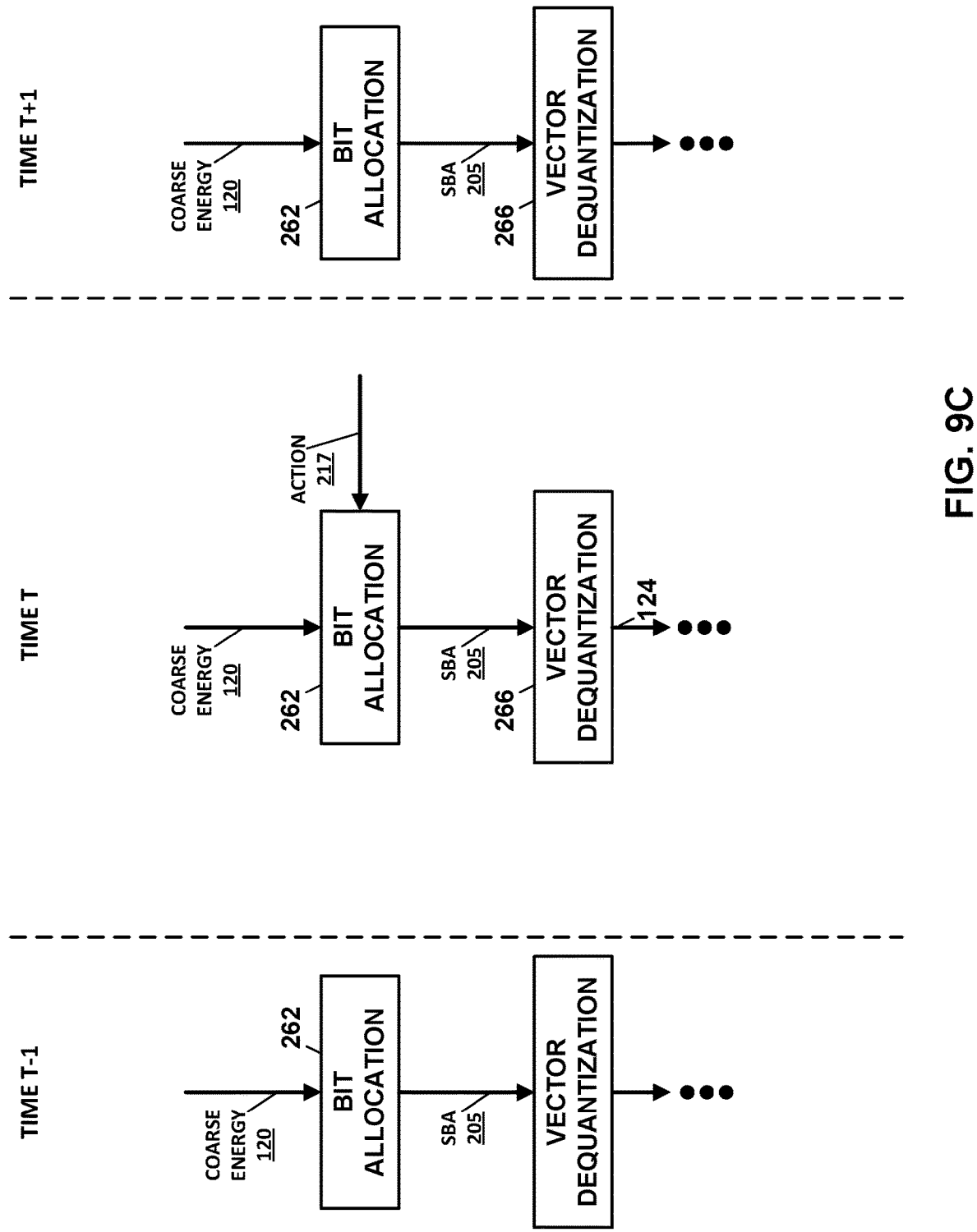

FIG. 9A-9C are block diagrams illustrating operation of the audio decoder shown in FIGS. 1 and 6 to maintain the controller in a manner that allows for synchronization with the audio encoder in accordance with various aspects of the techniques described in this disclosure. Referring first to the example of FIG. 9A, the audio decoder 44 may operate in a manner substantially similar to the audio encoder 24 as described above with respect to FIG. 8, except that the audio decoder 44 may perform vector dequantization rather than vector quantization.

Referring next to the example of FIG. 9B, the audio decoder 44 may operate in a manner similar to the audio decoder 44 described above with respect to FIG. 9A, except that the audio encoder 24 signals the reward 213 in the bitstream 25. As such, the audio decoder 44 does not implement the reward function, and instead parses the reward 213 from the bitstream 25. The audio decoder 44 may perform, based on the reward 213, learning: critic 268 to obtain the TD error 215, and perform, based on state 211, recall 270 to obtain action 217. The audio decoder 44 may determine, based on the action 217 and the course energy 120, the SBA 205 and perform vector dequantization 266.

Referring next to the example of FIG. 9C, the audio decoder 44 may operate in a manner similar to the audio decoder 44 described above with respect to FIG. 9B, except that the audio encoder signals the action 217 in the bitstream 25. As such, the audio decoder does not implement the reward function and the recall:action (policy) function, and instead parses the action 217 from the bitstream 25. The audio decoder 44 may determine, based on the action 217 and the course energy 120, the SBA 205 and perform vector dequantization 266.

Figure 10:
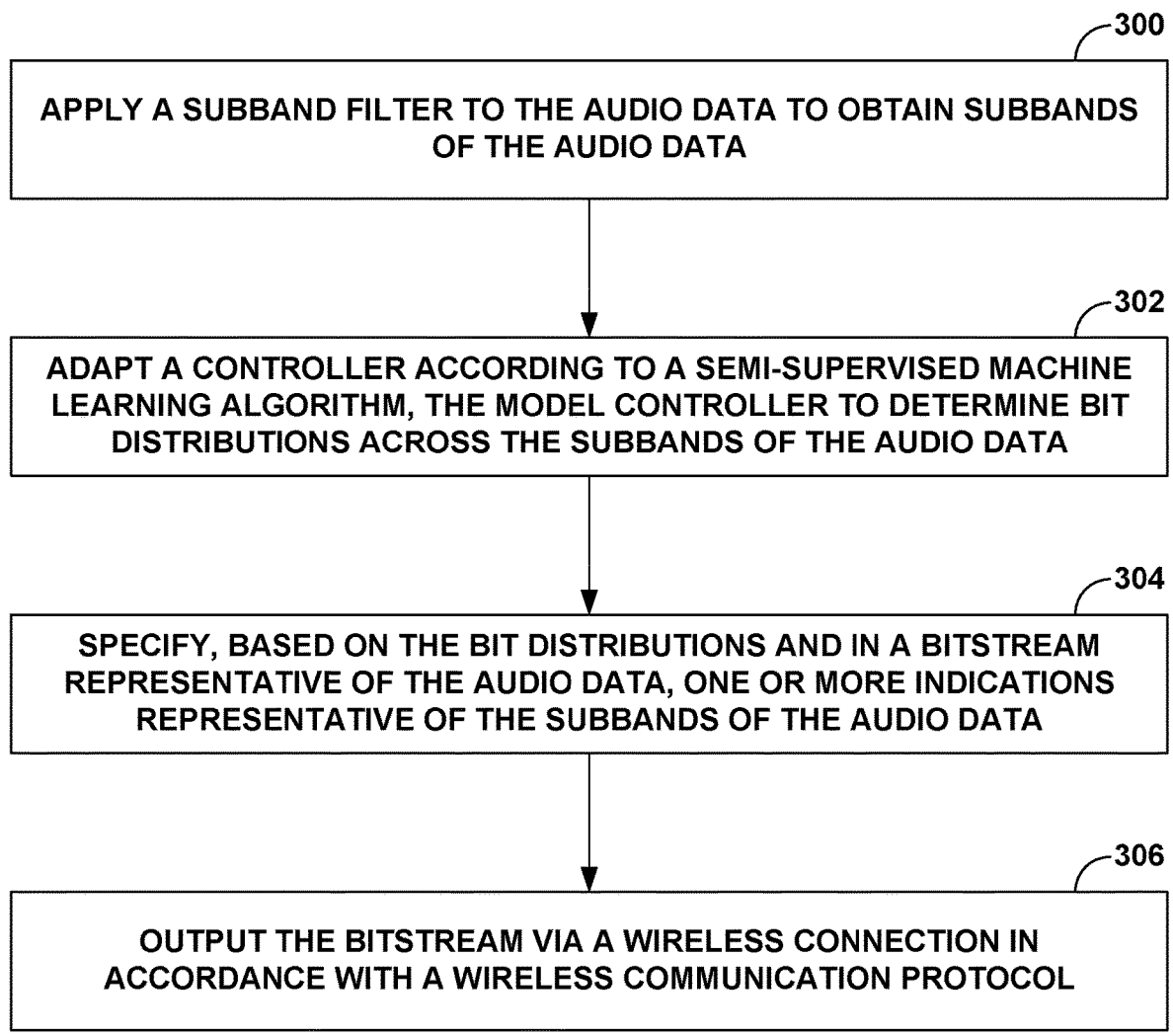
FIG. 10 is a flowchart illustrating example operation of the source device of FIG. 1 in performing various aspects of the techniques described in this disclosure.

FIG. 10 is a flowchart illustrating example operation of the source device 12 of FIG. 1 in performing various aspects of the techniques described in this disclosure. The source device 12 may first apply a subband filter to the audio data 21 to obtain subbands 114 of the audio data 21 (300). The source device 12 may next adapt a controller 202 according to a semi-supervised machine learning algorithm, the controller 202 configured to determine bit distributions across the subbands 114 of the audio data 21 (302).

The source device 12 may specify, based on the bit distributions (e.g., one or more of the EBA 203 and the SBA 205) and in a bitstream 25 representative of the audio data 21 (which may also be referred to as encoded audio data 25), one or more indications (e.g., the coarse energy 120, the fine energy 122, and the residual ID 124) representative of the subbands 114 of the audio data 21 (304). The source device 12 may output the bitstream 25 via a wireless connection 31 in accordance with a wireless communication protocol.

Figure 11:
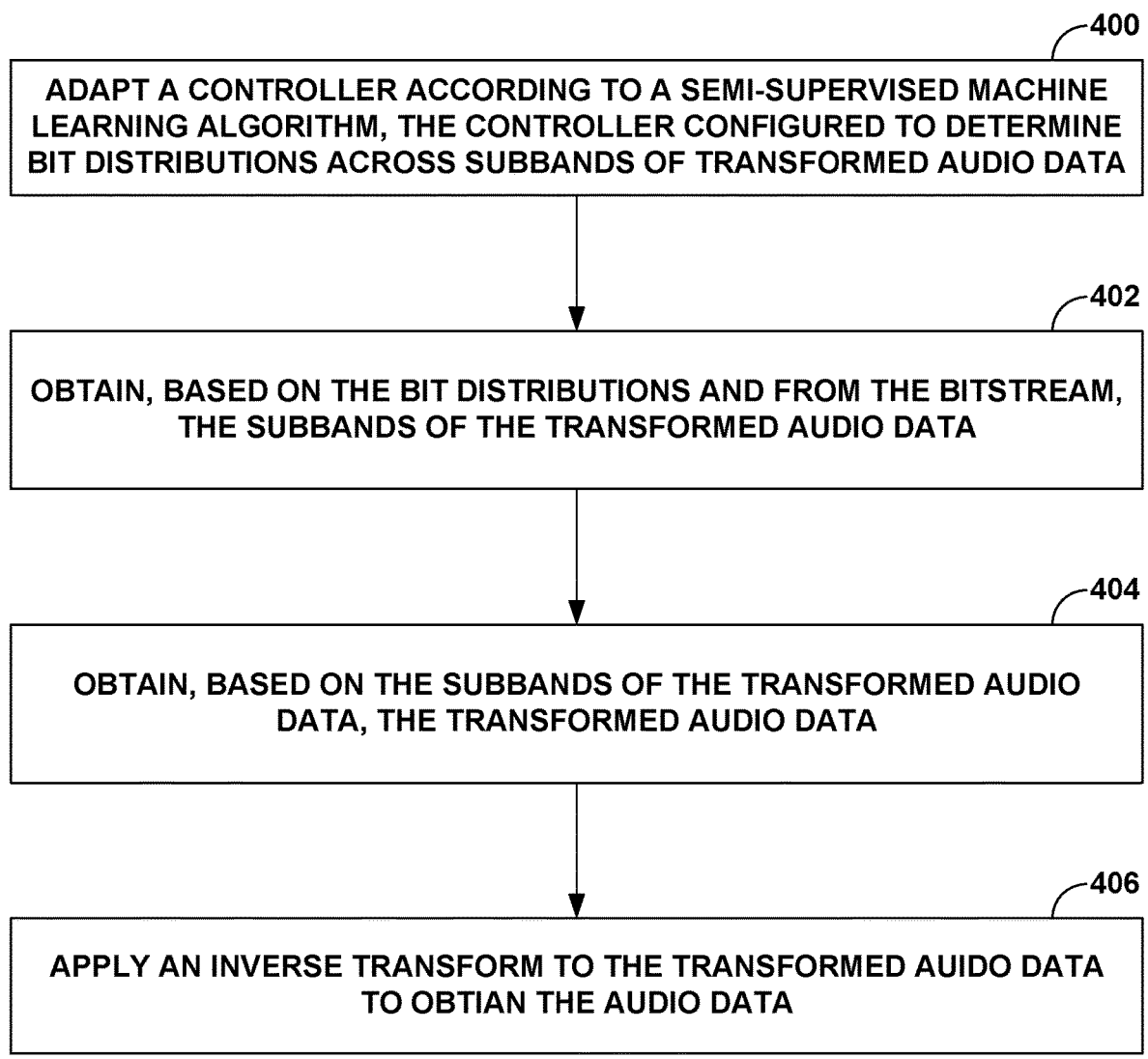
FIG. 11 is a flowchart illustrating example operation of the sink device of FIG. 1 in performing various aspects of the techniques described in this disclosure.

FIG. 11 is a flowchart illustrating example operation of the sink device 14 of FIG. 1 in performing various aspects of the techniques described in this disclosure. The sink device 14 may first adapt a controller 202 according to a semi-supervised machine learning algorithm, the controller 202 configured to determine bit distributions 203 and 205 across subbands 114 of transformed audio data 25 (which is another way to refer to the encoded audio data 25) (400). Based on the bit distributions 203 and 205 and from the bitstream 25, the sink device 14 may obtain the subbands 114 of the transformed audio data 25 (402). The sink device 14 may next obtain, based on the subbands 114 of the transformed audio data 25, the transformed audio data 25 (404). The sink device 14 may apply an inverse transform to the transformed audio data 25 to obtain the audio data 21' (406).

Perceptual models may be complex and difficult when used as an ultimate differentiable objective function for a gradient-based optimization. In some examples, perceptual models are only used to shape the quantization noise, rather than as a final perceptual quality critic.

Obtaining an acceptable perceptual accuracy may involve sufficiently high spectral resolution in frame-based encoding, as a result potentially requiring processing of longer windows of samples. It may then become a challenge to maintain perceptual transparency for low-bitrate applications. Furthermore, reliance on the availability of an exact perceptual model also may make such perceptual models unable to capture environmental factors that are not explicitly incorporated into the model.

In addition, masked quantization noise that is assumed to be imperceptible can also become perceptible again if other blocks of post-processing and signal enhancement are added to the system. The post-processing and signal enhancement blocks may not be easily, efficiently and naturally adapted to environmental conditions, and coding feature changes requested by the network on-the-fly.

Use of interactive Artificial Intelligent (AI) systems for audio coding and their enabling capabilities on reducing prior domain knowledge requirements, trial-and-error-based learning with reduced dependency on modeling, and their huge potentials for increasing scalability, environment/network driven adaptation, and perceptually plausible control of redundancy reduction, has not been well studied, partially due to the non-explicit representation of the audio coding problem to be re-defined as a sequential decision making and optimal control problem.

That is, use of interactive Artificial Intelligent (AI) systems for audio coding and their enabling capabilities on reducing prior domain knowledge requirements, trial-and-error-based learning with reduced dependency on modeling, and their huge potentials for increasing scalability, environment/network driven adaptation, and perceptually plausible control of redundancy reduction, has not been well studied, partially due to the non-explicit representation of the audio coding problem to be re-defined as a sequential decision making and optimal control problem. Existing perceptual solutions utilize psychoacoustic models to mask perceptible quantization noise.

Such models are often complex and are difficult to be used as an ultimate objective function for a gradient-based optimization. Thus, they are only used to shape the quantization noise, rather than as a final perceptual quality critic. Additionally, obtaining an acceptable perceptual accuracy needs sufficient spectral resolution in frame-based encoding, as a result requiring processing of longer windows of samples. Therefore, it becomes challenging to maintain perceptual transparency for low-latency applications.

Reliance on the availability of an exact model makes them also not able to capture environmental factors that are not explicitly incorporated into the model. Masked quantization noise that is assumed to be imperceptible can also become perceptible again if other blocks of post-processing and signal enhancement are added to the system. Similarly, they cannot easily, efficiently and naturally adapt to environmental conditions, and coding feature changes requested by the network on-the-fly.

Experience-driven autonomous solutions that can provide ultimate interaction-based reward or punishment of codec function adaptations can also address some of the problems in the codec design itself, where explicit labels or distortion measures can be challenging to obtain, manage, and adapt, or be unavailable/missing, not well-defined, or not far-sighted. They can facilitate incorporation of more sophisticated perceptual and cognitive models, adapt efficiently to different noise types, unmodeled disturbances, post-processing effects, unexpected compromise in streaming reliability, and capture some of the dependencies and redundancies among multiple packets of streaming rather than independent frame-by-frame compression.

In line with such limitations of the existing solutions, the techniques described in this disclosure provide a reinforcement learning (RL) algorithm for an audio codec system that can sense and react to the environment. The RL algorithm may enable the audio codec to accommodate streaming and/or archiving compression circumstances by interacting with the environment, and using the consequences (as measured by a reward) of those interactions to improve the compression policy of the audio codec. A more general statement of the goal is to minimize user or designer intervention towards a fully autonomous and self-adaptive compression control.

RL may provide a suitable framework for that purpose with a vast range of tools available in the AI algorithm landscape. Function approximators along with any class of value function processes or policy search algorithms can be considered. These algorithms can be utilized in their model-free variants for scalable streaming and model-based solutions for archiving applications.

However, they will not be directly applicable to the problem of perceptual audio coding for two major reasons: 1—It is not explicitly defined as a sequential decision-making problem, 2—Encoder/decoder synchronization of the RL updating and learning trajectory would require a prohibitive amount of overhead, effectively limiting the compression efficiency advantages.

The techniques of this disclosure may formulate the dynamic bit-allocation in critical bands of hearing in a Modified Discrete Cosine Transform (MDCT) space, as a sequential decision-making problem where actions generated by the policy function controls the audio coded bit distribution (or, in other words, allocation), and transitions the agent from a current state of bit distribution to the next state of the bit distribution. Rewards received from interaction with the environment, comprising feedback from several factors including network conditions, streaming rate, perceptual and cognitive models, scalability request fulfilments, and robustness/reliability events, are then observed and used in updating.

To reduce bit-rate overhead communicating the RL agent updates between encoder and decoder, the audio codec may use actor-critic algorithms that provide separate value and policy representations, making it possible for the source and sink devices to synchronize in carrying and executing the course of learning, state-action value updates, and action selection policy decisions. This may be enabled by delaying actor updating in the encoder by the critic, one frame, allowing the decoder to use the same actor and policy function, and the observed reward is used consistently with the associated state-action pair. After the decoder actor (policy) has also synchronously received the same reward, the critic (value) may calculate the temporal difference error, and accordingly update the policy, action-selection parameters, and the exploration/exploitation rules.

To restate the above techniques, a Reinforcement Learning (RL) algorithm is proposed towards an audio codec system that can sense and react to its world. RL solutions enable it to accommodate streaming and/or archiving compression circumstances by interacting with the environment, and using the consequences of those interactions to improve its compression policy. A more general statement of the goal is to minimize user or designer intervention towards a fully autonomous and self-adaptive compression control. RL provides a suitable framework for that purpose with a vast range of tools available in the AI literature. Function approximators along with any class of value function methods or policy search algorithms can be considered. They can be utilized in their model-free variants for scalable streaming and model-based solutions for archiving applications. However, they will not be directly applicable to the problem of perceptual audio coding for two major reasons: 1—It is not explicitly defined as a sequential decision-making problem, 2—Encoder/decoder synchronization of the RL updating and learning trajectory would require a prohibiting amount of overhead, effectively limiting the compression efficiency advantages.

This disclosure formulates the dynamic bit-allocation in critical bands of hearing in a Modified Discrete Cosine Transform (MDCT) space, as a sequential decision-making problem where actions generated by the policy function controls its bit distribution, and transitions the agent from a current state of bit distribution to the next. Immediate rewards received from interaction with the environment, comprising feedback from several factors including network conditions, streaming rate, perceptual and cognitive models, scalability request fulfilments, and robustness/reliability events, are then observed and used in updating.

To reduce bit-rate overhead communicating the RL agent updates between encoder and decoder, the disclosure discusses use of actor-critic algorithms that provide separate value and policy representations, making it possible for sink and source to synchronize in carrying and executing the course of learning, state-action value updates, and action selection policy decisions. This is enabled by delaying actor updating in the encoder by the critic, one frame, ensuring the decoder uses the same actor and policy function, and the observed reward is used consistently with the associated state-action pair.

After the decoder actor (policy) has also synchronously received the same immediate reward, the critic (value) calculates the temporal difference error, and accordingly updates the policy, action-selection parameters, and the exploration/exploitation rules. In applications where extreme exploratory actions can lead to costly audio compression unwanted effects in real-time or completely undesirable perceptual degradations, the initial bit distribution is initialized with a reliable allocation that ensures a minimally-acceptable baseline performance under the entire expected search spaces of state and action.

Figure 12:
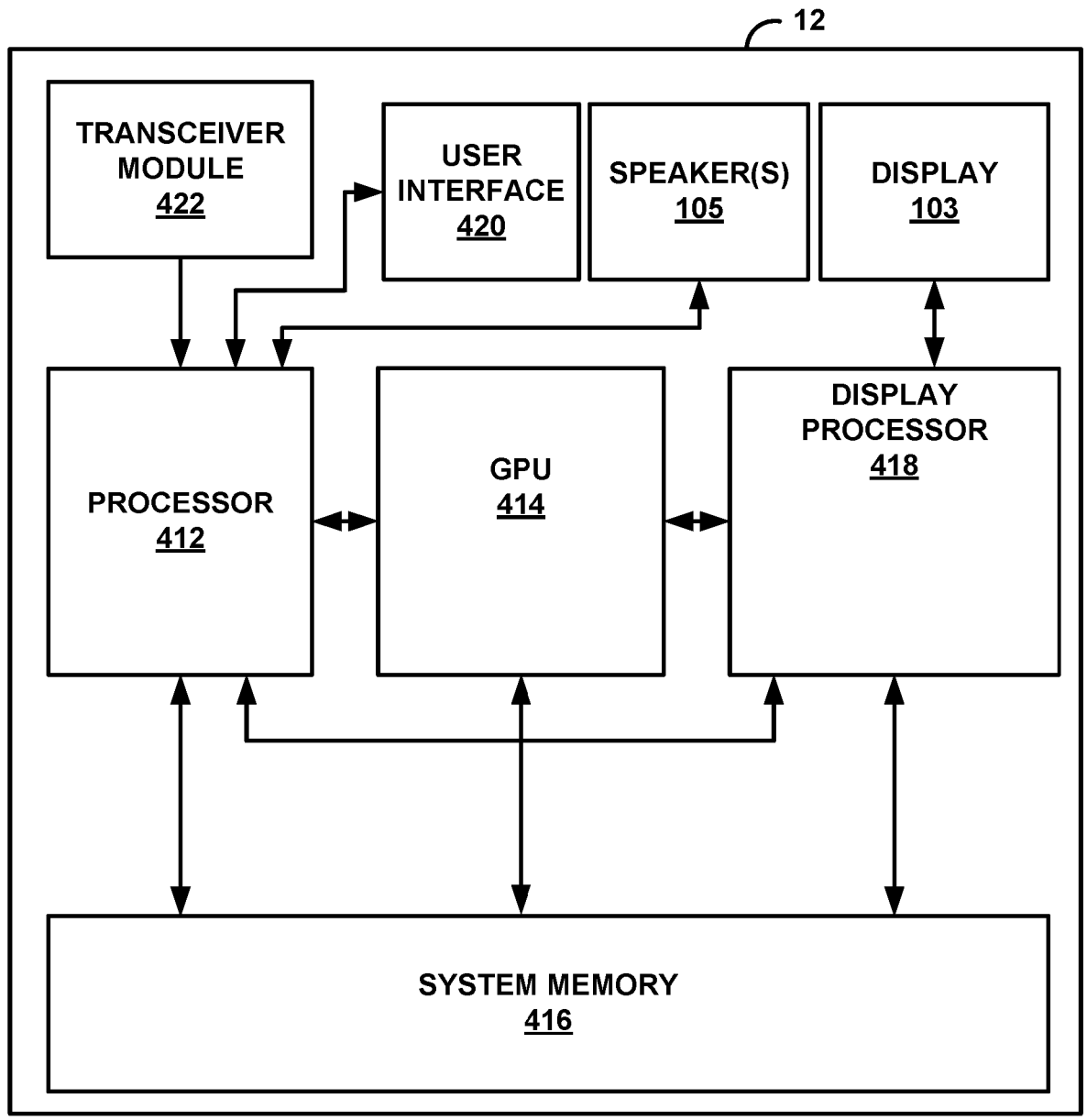
FIG. 12 is a block diagram illustrating example components of the source device shown in the example of FIG. 1.

FIG. 12 is a block diagram illustrating example components of the source device 12 shown in the example of FIG. 1. In the example of FIG. 12, the source device 8 includes a processor 412, a graphics processing unit (GPU) 414, system memory 416, a display processor 418, one or more integrated speakers 105, a display 103, a user interface 420, and a transceiver module 422. In examples where the source device 12 is a mobile device, the display processor 418 is a mobile display processor (MDP). In some examples, such as examples where the source device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, fixed function and/or programmable processing circuitry, such as one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the mixing unit 22, the audio encoder 24, the wireless connection manager 26, and the wireless communication units 30. The transceiver module 422 may represent a unit configured to establish and maintain the wireless connection between the source device 12 and the sink device 14. The transceiver module 422 may represent one or more receivers and one or more transmitters capable of wireless communication in accordance with one or more wireless communication protocols. The transceiver module 422 may perform all or some portion of the operations of one or more of the wireless connection manager 26 and the wireless communication units 30.

Figure 13:
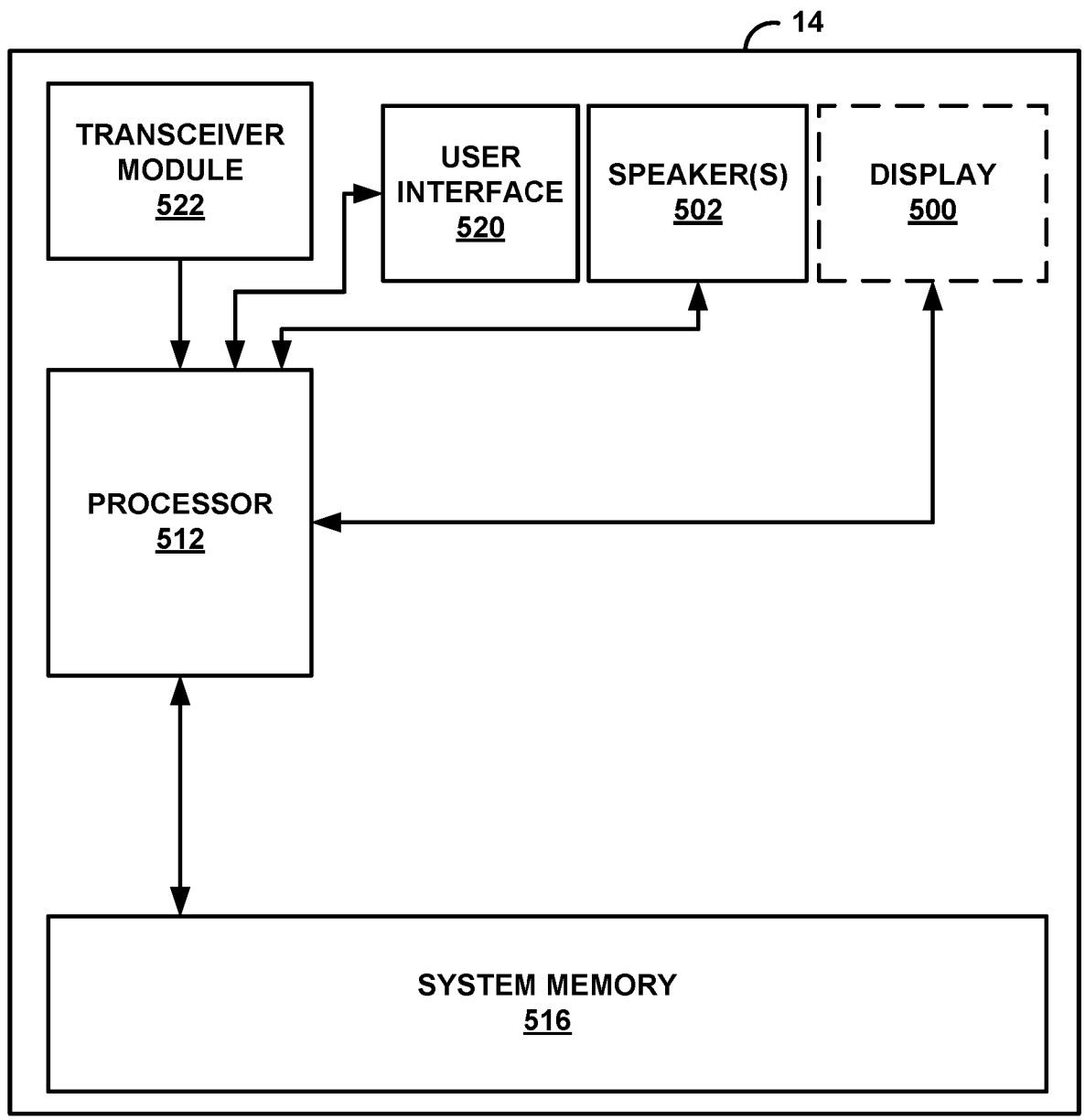
FIG. 13 is a block diagram illustrating exemplary components of the sink device shown in the example of FIG. 1.

FIG. 13 is a block diagram illustrating exemplary components of the sink device 14 shown in the example of FIG. 1. Although the sink device 14 may include components similar to that of the source device 12 discussed above in more detail with respect to the example of FIG. 12, the sink device 14 may, in certain instances, include only a subset of the components discussed above with respect to the source device 12.

In the example of FIG. 13, the sink device 14 includes one or more speakers 502, a processor 512, a system memory 516, a user interface 520, and a transceiver module 522. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, and the transceiver module 522 may be similar to or substantially similar to the respective speakers 402, user interface 420, and transceiver module 422. The sink device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to one or more of the wireless connection manager 40, the wireless communication units 42, and the audio decoder 44. The transceiver module 522 may represent a unit configured to establish and maintain the wireless connection between the source device 12 and the sink device 14. The transceiver module 522 may represent one or more receivers and one or more transmitters capable of wireless communication in accordance with one or more wireless communication protocols. The transceiver module 522 may perform all or some portion of the operations of one or more of the wireless connection manager 40 and the wireless communication units 28.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, high-order ambisonics (HOA) audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into various representations for playback by one or more of the playback elements. For instance, a user of the mobile device may record (acquire a soundfield of) a live event (e.g., a meeting, a conference, a play, a concert, etc.), and code the recording into various representation, including higher order ambisonic HOA representations.

The mobile device may also utilize one or more of the playback elements to playback the coded soundfield. For instance, the mobile device may decode the coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a headset or headphones, e.g., to create realistic binaural sound.

In some examples, a particular mobile device may both acquire a soundfield and playback the same soundfield at a later time. In some examples, the mobile device may acquire a soundfield, encode the soundfield, and transmit the encoded soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of audio signals. For instance, the one or more DAWs may include audio plugins and/or tools which may be configured to operate with (e.g., work with) one or more game audio systems. In some examples, the game studios may output new stem formats that support audio format. In any case, the game studios may output coded audio content to the rendering engines which may render a soundfield for playback by the delivery systems.

The mobile device may also, in some instances, include a plurality of microphones that are collectively configured to record a soundfield, including 3D soundfields. In other words, the plurality of microphone may have X, Y, Z diversity. In some examples, the mobile device may include a microphone which may be rotated to provide X, Y, Z diversity with respect to one or more other microphones of the mobile device.

A ruggedized video capture device may further be configured to record a soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a soundfield that represents the action all around the user (e.g., water crashing behind the user, another rafter speaking in front of the user, etc.).

The techniques may also be performed with respect to an accessory enhanced mobile device, which may be configured to record a soundfield, including a 3D soundfield. In some examples, the mobile device may be similar to the mobile devices discussed above, with the addition of one or more accessories. For instance, a microphone, including an Eigen microphone, may be attached to the above noted mobile device to form an accessory enhanced mobile device. In this way, the accessory enhanced mobile device may capture a higher quality version of the soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a soundfield, including a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the soundfield, including 3D soundfields, of the sports game may be acquired (e.g., one or more microphones and/or Eigen microphones may be placed in and/or around the baseball stadium). HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the source device 12 may perform a method or otherwise comprise means to perform each step of the method for which the source device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the source device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A source device configured to stream audio data, the source device comprising:
   a memory configured to store at least a portion of the audio data; and
   one or more processors configured to:
   apply a filter to the audio data to obtain subbands of the audio data;
   adapt a controller according to a machine learning algorithm, the controller configured to determine bit distributions across the subbands of the audio data;
   specify, based on the bit distributions and in a bitstream representative of the audio data, one or more indications representative of the subbands of the audio data; and
   output the bitstream via a wireless connection in accordance with a wireless communication protocol.

2. The source device of claim 1, wherein the one or more processors are configured to adapt the controller according to a semi-supervised machine learning algorithm.

3. The source device of claim 1, wherein the one or more processors are configured to adapt the controller according to a supervised machine learning algorithm.

4. The source device of claim 1, wherein the one or more processors are configured to adapt the controller according to an unsupervised machine learning algorithm.

5. The source device of claim 1, wherein the one or more processors are configured to apply a subband filter to the audio data to obtain the subbands of the audio data.

6. The source device of claim 1, wherein the one or more processors are configured to adapt the controller according to a reinforcement learning algorithm in which the controller is adapted based on a reinforcement provided to a model.

7. The source device of claim 6, wherein the reinforcement learning algorithm includes an actor-critic algorithm in which the controller acts as an actor that maps state observed by the actor to an action that updates the bit distribution across one or more of the subbands to maximize a reward based on a temporal difference error provided by a critic that receives the reinforcement.

8. The source device of claim 7, wherein the reward includes one of or a combination of two or more of a network condition, a streamlining rate, an output from a perceptual model, an output from a cognitive model, a scalability request fulfillment, a robustness event, and a reliability event.

9. The source device of claim 1, wherein the one or more processors are configured to:
   specify, based on the bit distributions and in the bitstream, a first indication indicative of an energy for each of the subbands of the audio data; and
   specify, based on the bit distributions and in the bitstream, a second indication indicative of a shape for each of the subbands of the audio data.

10. The source device of claim 9, wherein the one or more processors further are configured to perform a gain shape analysis with respect to the subbands of the audio data to obtain the energy for each of the subbands of the audio data and the shape for each of the subbands of the audio data.

11. The source device of claim 1, wherein the one or more processors include a transceiver configured to output the bitstream via the wireless connection in accordance with the wireless communication protocol.

12. The source device of claim 1, wherein the wireless communication protocol comprises a personal area network wireless communication protocol.

13. The source device of claim 12, wherein the personal area network wireless communication protocol comprises a Bluetooth® wireless communication protocol.

14. The source device of claim 1, wherein the one or more processors are further configured to receive the audio data from a microphone.

15. The source device of claim 1, further comprising a microphone configured to capture the audio data.

16. A method for streaming audio data, the method comprising:
   applying a filter to the audio data to obtain subbands of the audio data;
   adapting a controller according to a machine learning algorithm, the controller configured to determine bit distributions across the subbands of the audio data;
   specifying, based on the bit distributions and in a bitstream representative of the audio data, one or more indications representative of the subbands of the audio data; and
   outputting the bitstream via a wireless connection in accordance with a wireless communication protocol.

17. A sink device configured to process a bitstream representative of audio data, the sink device comprising:
   a memory configured to store at least a portion of the bitstream; and
   one or more processors configured to:
   adapt a controller according to a machine learning algorithm, the controller configured to determine bit distributions across subbands of transformed audio data;
   obtain, based on the bit distributions and from the bitstream, the subbands of the transformed audio data;
   obtain, based on the subbands of the transformed audio data, the transformed audio data; and
   apply an inverse transform to the transformed audio data to obtain the audio data.

18. The sink device of claim 17, wherein the one or more processors are configured to adapt the controller according to a semi-supervised machine learning algorithm.

19. The sink device of claim 17, wherein the one or more processors are configured to adapt the controller according to a supervised machine learning algorithm.

20. The sink device of claim 17, wherein the one or more processors are configured to adapt the controller according to an unsupervised machine learning algorithm.

21. The sink device of claim 17, wherein the one or more processors are configured to adapt the controller according to a reinforcement learning algorithm in which the controller is adapted based on a reinforcement provided to a model.

22. The sink device of claim 21, wherein the reinforcement learning algorithm includes an actor-critic learning algorithm in which the model acts as an actor that maps state observed by the actor to an action that updates the bit distribution across one or more of the subbands in an attempt to maximize expected reward based on a temporal difference error provided by a critic that receives the reinforcement.

23. The sink device of claim 22, wherein the reward includes one of or a combination of two or more of a network condition, a streamlining rate, an output from a perceptual model, an output from a cognitive model, a scalability request fulfillment, a robustness event, and a reliability event.

24. The sink device of claim 17, wherein the one or more processors are configured to:
   obtain, based on the bit distributions and from the bitstream, a first indication indicative of an energy for each of the subbands of the transformed audio data;
   obtain, based on the bit distributions and from the bitstream, a second indication indicative of a shape for each of the subbands of the transformed audio data; and
   obtain, based on the first indication and the second indications, the subbands of the transformed audio data.

25. The sink device of claim 17, further comprising a transceiver configured to receive the bitstream via a wireless connection in accordance with a wireless communication protocol.

26. The sink device of claim 25, wherein the wireless communication protocol comprises a personal area network wireless communication protocol.

27. The sink device of claim 26, wherein the personal area network wireless communication protocol comprises a Bluetooth® wireless communication protocol.

28. The sink device of claim 17, wherein the one or more processors are further configured to:
   render the audio data to one or more speaker feeds; and
   output the speaker feeds to one or more speakers.

29. The sink device of claim 17,
   wherein the one or more processors are further configured to render the audio data to one or more speaker feeds, and
   wherein the sink device includes one or more speakers that reproduce, based on the speaker feeds, a soundfield.

30. A method of processing a bitstream representative of audio data, the method comprising:
   adapting a controller according to a machine learning algorithm, the controller configured to determine bit distributions across subbands of transformed audio data;
   obtaining, based on the bit distributions and from the bitstream, the subbands of the transformed audio data;
   obtaining, based on the subbands of the transformed audio data, the transformed audio data; and
   applying an inverse transform to the transformed audio data to obtain the audio data.

* * * * *